(12) United States Patent
Tang et al.

(10) Patent No.: US 10,266,133 B2
(45) Date of Patent: Apr. 23, 2019

(54) ELECTRICAL CONNECTOR

(71) Applicant: SZ DJI TECHNOLOGY CO., LTD., Shenzhen (CN)

(72) Inventors: Yin Tang, Shenzhen (CN); Jiangang Feng, Shenzhen (CN); Tao Peng, Shenzhen (CN); Lei Wang, Shenzhen (CN); Wentao Wang, Shenzhen (CN)

(73) Assignee: SZ DJI Technology Co., Ltd., Shenzhen (CN)

( * ) Notice: Subject to any disclaimer, the term of this patent is extended or adjusted under 35 U.S.C. 154(b) by 0 days.

(21) Appl. No.: 15/994,086

(22) Filed: May 31, 2018

(65) Prior Publication Data

US 2018/0287326 A1 Oct. 4, 2018

Related U.S. Application Data

(63) Continuation of application No. PCT/CN2016/074914, filed on Feb. 29, 2016.

(51) Int. Cl.
| | |
|---|---|
| *B60R 16/03* | (2006.01) |
| *H01R 12/70* | (2011.01) |
| *H01R 43/24* | (2006.01) |
| *H01R 9/24* | (2006.01) |
| *H01R 13/40* | (2006.01) |
| *H01R 13/405* | (2006.01) |

(Continued)

(52) U.S. Cl.
CPC ........... *B60R 16/03* (2013.01); *H01R 9/2491* (2013.01); *H01R 12/7088* (2013.01);
(Continued)

(58) Field of Classification Search
CPC .. H01R 12/52; H01R 12/7088; H01R 13/514; H01R 13/652; H01R 13/04; H01R 43/0256; Y10S 439/9241
See application file for complete search history.

(56) References Cited

U.S. PATENT DOCUMENTS

2010/0041266 A1* 2/2010 Data ................... H01R 13/629
439/358
2013/0303033 A1* 11/2013 Rong .................. H01R 13/113
439/737

(Continued)

FOREIGN PATENT DOCUMENTS

CN 201118054 Y 9/2008
CN 201956472 U * 8/2011

(Continued)

OTHER PUBLICATIONS

International Searching Authority, International Search Report and Written Opinion of the International Searching Authority, PCT/CN2016/074914, dated Nov. 29, 2016, 10 pages.

*Primary Examiner* — Timothy D Collins
*Assistant Examiner* — Tye William Abell
(74) *Attorney, Agent, or Firm* — Perkins Coie LLP

(57) ABSTRACT

An electrical connector is provided for both power and data transmission. The electrical connector comprises an electrical plug (100) having a plurality of pins (131~138) and an electrical socket (200) having a plurality of passageways (220) which are arranged corresponding to the plurality of pins (131~138). The pins (131~138) of the plug comprise at least one signal pin (131, 136), two or more positive power pins (133, 134) and two or more negative power pins (132, 135). The pins (131~138) of the plug can be disposed such that the positive power pins (133, 134) and the at least one signal pin (131, 136) are positioned on opposite sides of the negative power pins (132, 135).

29 Claims, 19 Drawing Sheets

(51) Int. Cl.
*H01R 43/18* (2006.01)
*H01R 43/20* (2006.01)
*H01R 13/514* (2006.01)

(52) U.S. Cl.
CPC ........... *H01R 13/40* (2013.01); *H01R 13/405* (2013.01); *H01R 43/18* (2013.01); *H01R 43/205* (2013.01); *H01R 43/24* (2013.01); *H01R 13/514* (2013.01); *H01R 2201/26* (2013.01); *Y10S 439/9241* (2013.01)

(56) References Cited

U.S. PATENT DOCUMENTS

| | | | |
|---|---|---|---|
| 2014/0127949 A1* | 5/2014 | Yu | H01R 12/58 439/660 |
| 2015/0380870 A1 | 12/2015 | Kao et al. | |
| 2017/0104353 A1* | 4/2017 | Zhao | H02J 7/0063 |
| 2017/0110818 A1* | 4/2017 | Guo | H01R 12/716 |
| 2017/0133779 A1* | 5/2017 | Zhao | H01R 12/7088 |
| 2017/0155174 A1* | 6/2017 | Wang | H01M 2/1077 |
| 2017/0163060 A1* | 6/2017 | Zheng | H02J 7/0019 |
| 2017/0194746 A1* | 7/2017 | Freer | H01R 13/641 |

FOREIGN PATENT DOCUMENTS

| | | |
|---|---|---|
| CN | 201956472 U | 8/2011 |
| CN | 203377457 U | 1/2014 |
| CN | 205565228 U | 9/2016 |
| DE | 202015105928.0 U1 | 12/2015 |

\* cited by examiner

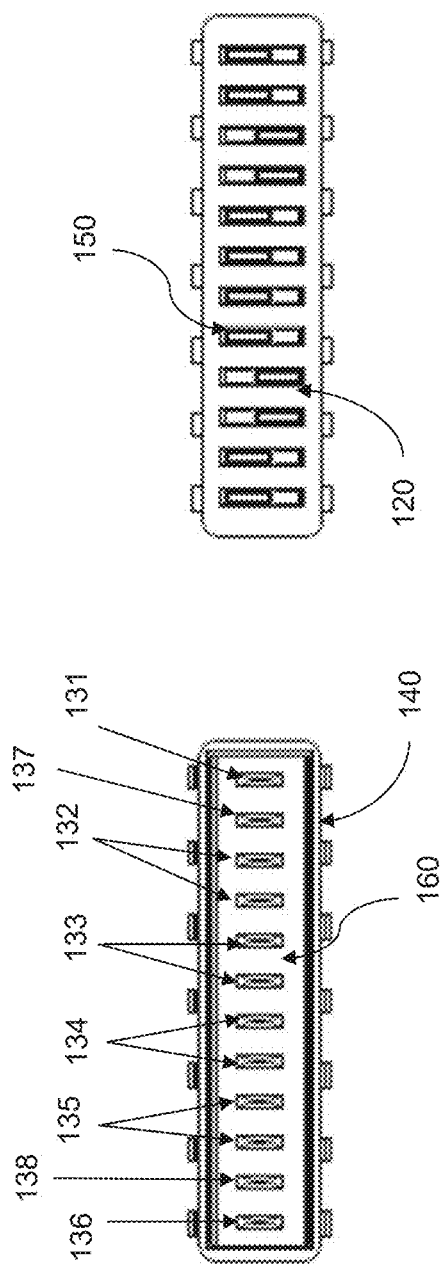
FIG. 4
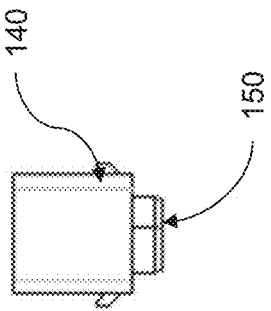
FIG. 6
FIG. 5

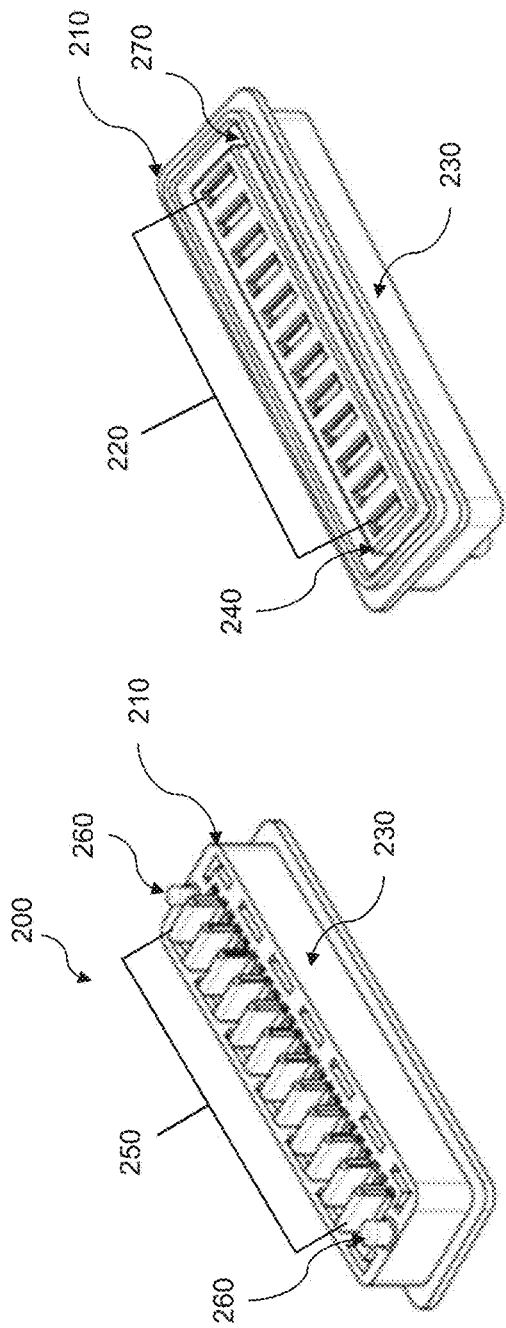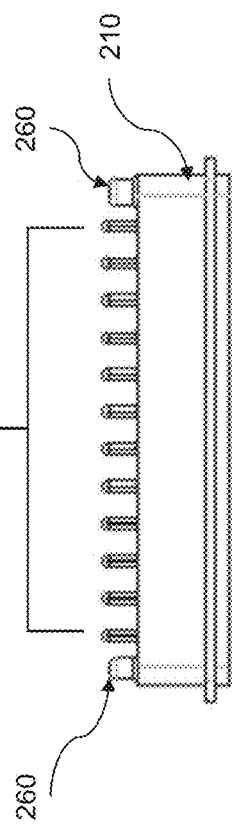

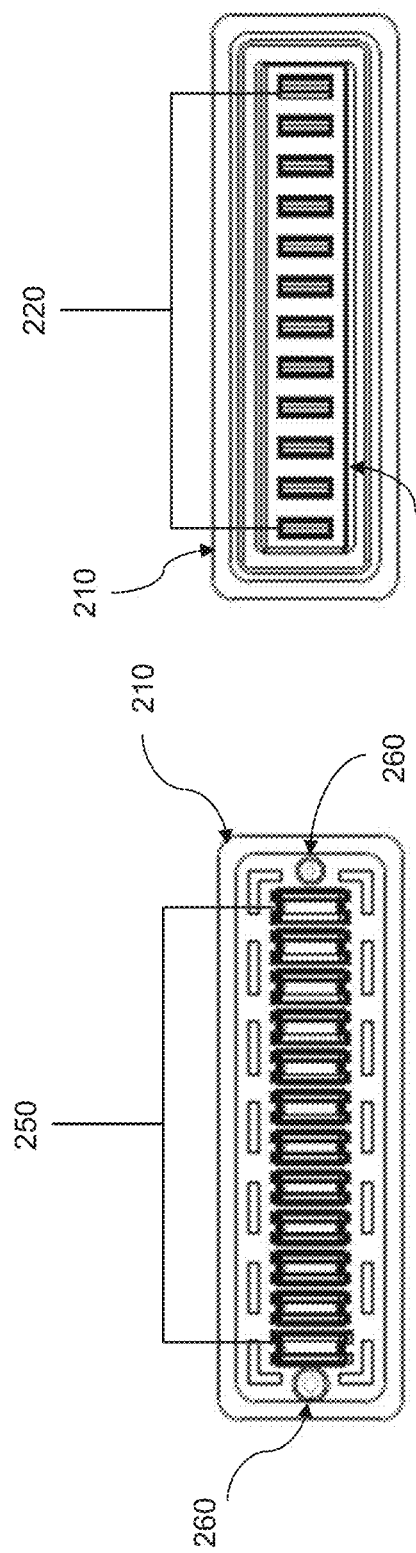
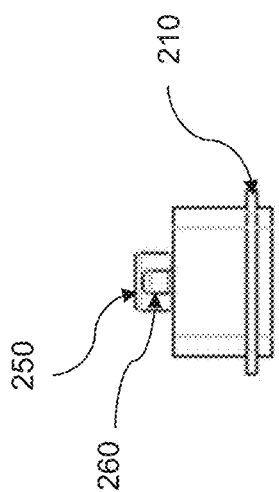
FIG. 10
FIG. 11
FIG. 12

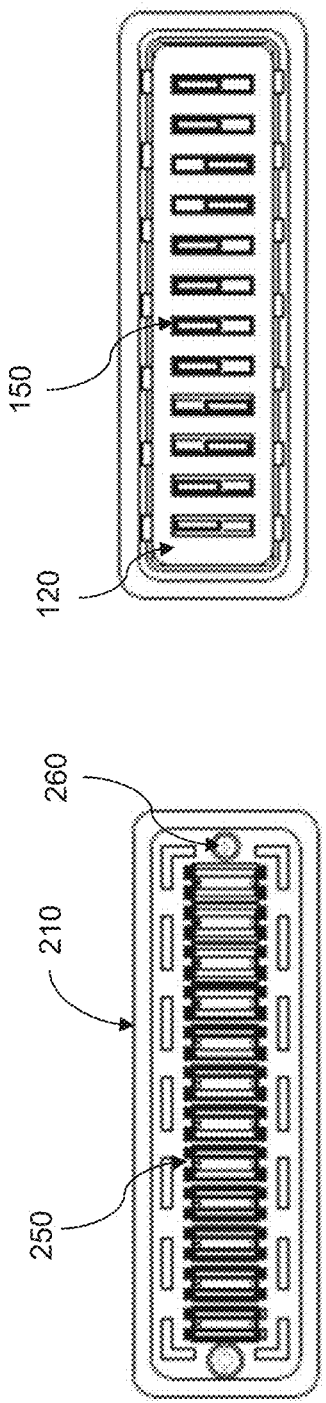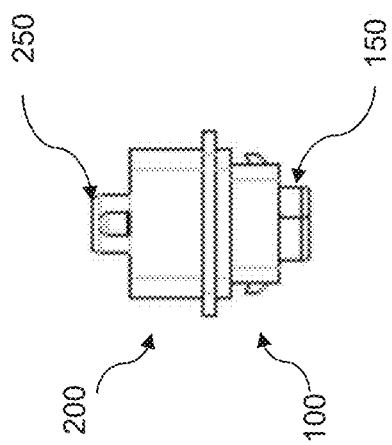
FIG. 17
FIG. 16
FIG. 18

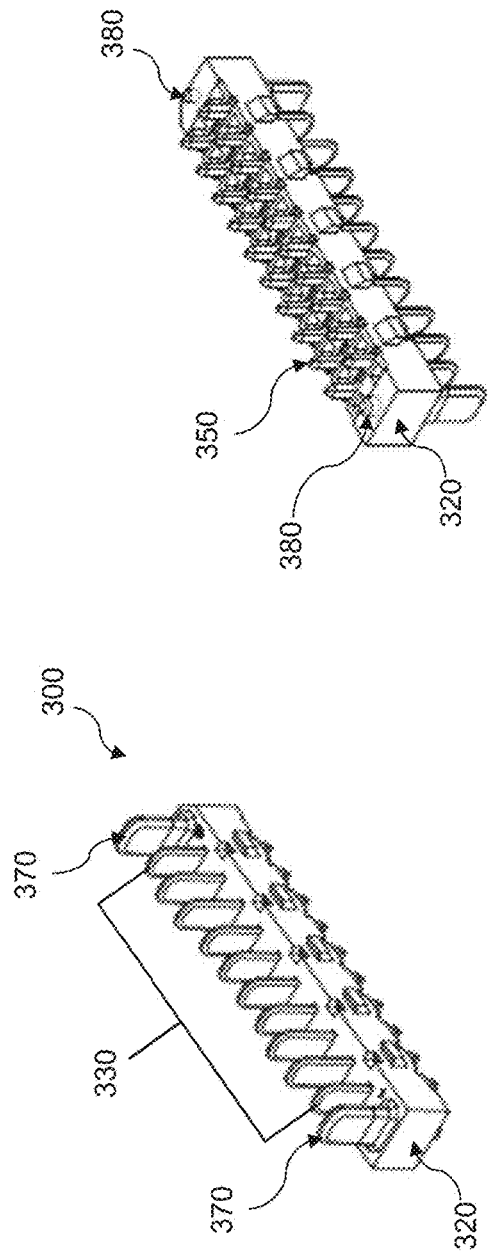
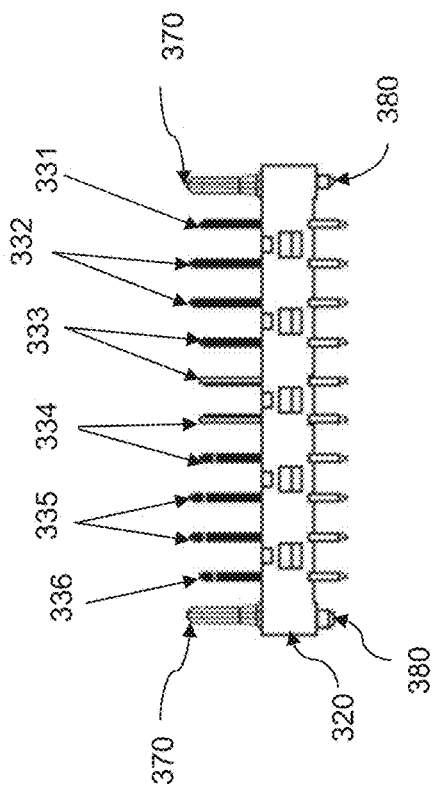
FIG. 19
FIG. 20
FIG. 21

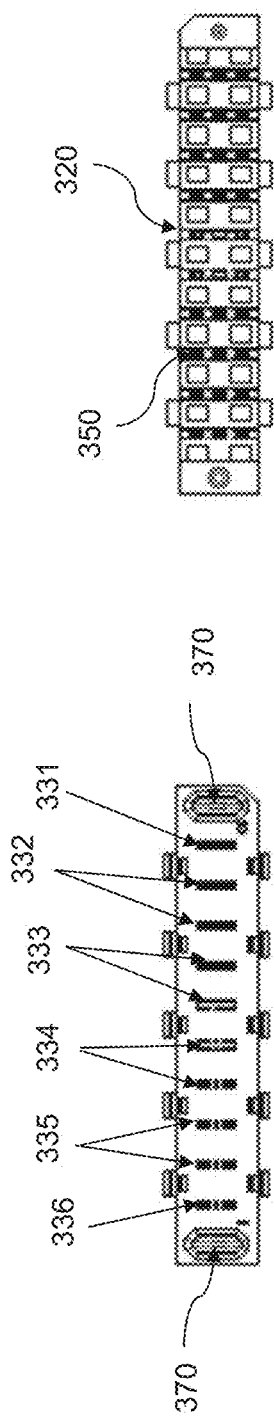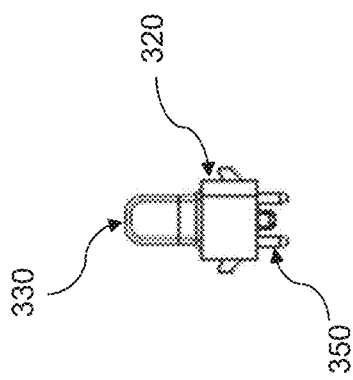
FIG. 23
FIG. 22
FIG. 24

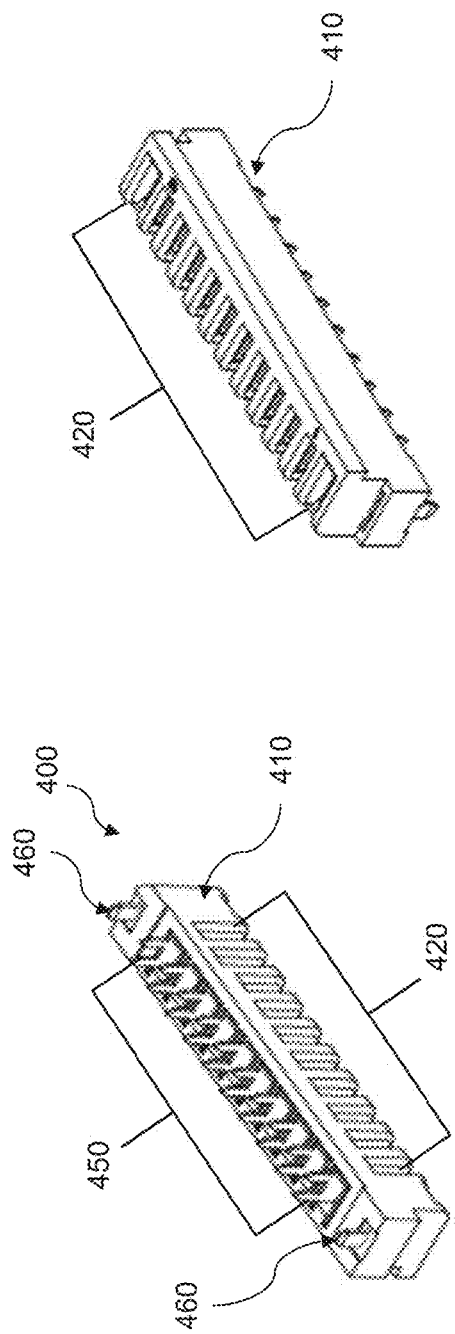
FIG. 25
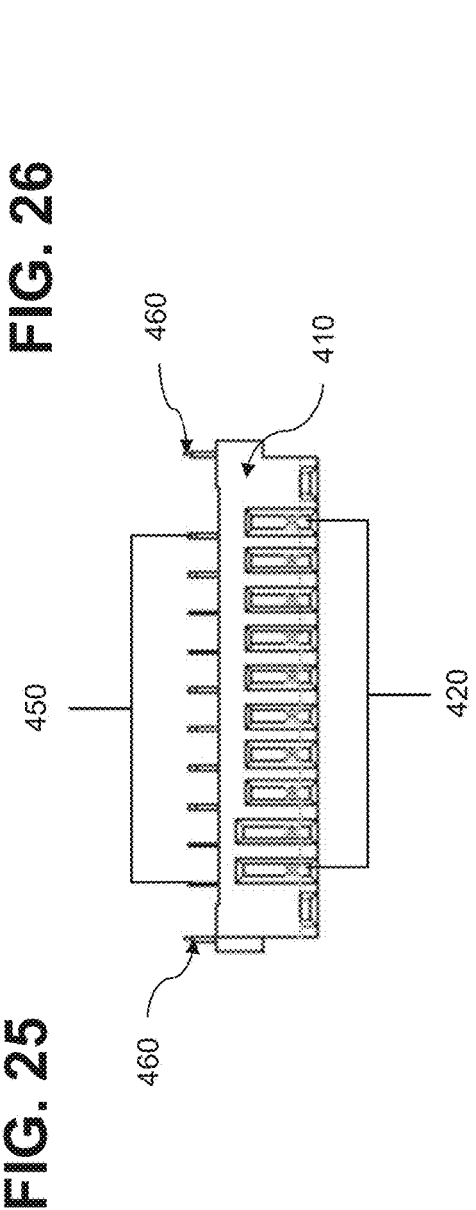
FIG. 26
FIG. 27

ELECTRICAL CONNECTOR

CROSS REFERENCE TO RELATED APPLICATION

The present application is a continuation of International Patent Application No. PCT/CN2016/074914, filed Feb. 29, 2016, which is incorporated herein by reference in its intirety.

BACKGROUND

An electrical connector is an electro-mechanical device for joining electrical circuits as an interface using a mechanical assembly. A connector can comprise a plug and a socket which are assembled together. A plug can be referred to as a male connector, and a socket can be referred to as a female connector.

In an electrical system such as a vehicle, various connectors are employed to transmit electrical power and data communication. For example, power connectors are employed to interconnect power lines to electrical circuits and power consuming components of the system, and signal connectors are employed transmit signal within the electrical system and with external devices.

SUMMARY

An electrical connector is provided for both power and data transmission. The electrical connector comprises an electrical plug having a plurality of pins and an electrical socket having a plurality of passageways which are arranged corresponding to the plurality of pins. In some embodiments, the pins of the plug comprise at least one signal pin, two or more positive power pins and two or more negative power pins. The electrical current is distributed over two or more power pins, such that a reliability of power transmission and an efficiency of heat dissipation can be improved.

The pins of the electrical plug can be disposed such that the positive power pins and the at least one signal pin are positioned on opposite sides of the negative power pins. The negative power pins can be provided longer than the positive power pins and the at least one signal pin, such that the negative power pins are grounded before the positive power pins are connected to the socket. The configuration of the plug pins can prevent a sparking when connecting the plug to the socket. In some embodiments, the plurality of power pins and the at least one signal pin can comprise a first set of pins and a second set of pins which are disposed symmetrically opposite to each other, such that the plug can be connected to the corresponding socket in both a forward direction and a reverse direction.

In some embodiments, each of the passageways of the socket has an entrance extending on more than one side of a socket housing, for example, on two adjacent sides of the socket housing, such that the pins of the plug can be inserted into the passageways of the socket in more than one direction. A positioning boss can be provided with the socket and assembled with a positioning groove of the plug, so as to ensure an accurate mating of the plug and the socket.

An aspect of the disclosure provides an electrical plug for power and signal transmission, comprising: at least one signal pin configured to communicate signal; a plurality of power pins configured to transmit electrical power, wherein the plurality of power pins comprise at least one power pin having a first polarity and at least one power pin having a second polarity opposite to the first polarity; and a plug substrate configured to support the at least one signal pin and the plurality of power pins.

Aspects of the disclosure also provides a method of manufacturing an electrical plug, the method comprising: providing a plug substrate; and disposing a plurality of power pins configured to transmit electrical power and at least one signal pin configured to communicate signal on the plug substrate, wherein the plurality of power pins comprise at least one power pin having a first polarity and at least one power pin having a second polarity opposite to the first polarity.

Aspects of the disclosure also provides a method of manufacturing an electrical plug, the method comprising: disposing a plurality of power pins configured to transmit electrical power and at least one signal pin configured to communicate signal in a mold, wherein the plurality of power pins comprise at least one power pin having a first polarity and at least one power pin having a second polarity opposite to the first polarity; and molding the plurality of power pins and at least one signal pin with a plug substrate.

Aspects of the disclosure also provides a movable object, comprising: a body; one or more propulsion units carried by the body and configured to effect movement of the movable object; and an electrical plug electrical plug for power and signal transmission, comprising: at least one signal pin configured to communicate signal; a plurality of power pins configured to transmit electrical power, wherein the plurality of power pins comprise at least one power pin having a first polarity and at least one power pin having a second polarity opposite to the first polarity; and a plug substrate configured to support the at least one signal pin and the plurality of power pins, wherein the one or more propulsion units are provided with electrical energy via the electrical plug.

Aspects of the disclosure also provides a battery management device for managing a battery assembly, the battery management device comprising: a battery management circuit electrically connected to the battery assembly and being configured to manage the battery assembly; and an electrical plug electrical plug for power and signal transmission, comprising: at least one signal pin configured to communicate signal; a plurality of power pins configured to transmit electrical power, wherein the plurality of power pins comprise at least one power pin having a first polarity and at least one power pin having a second polarity opposite to the first polarity; and a plug substrate configured to support the at least one signal pin and the plurality of power pins, wherein the electrical plug is provided with the battery management circuit and is configured to connect to the battery assembly.

Aspects of the disclosure also provides an electrical socket for power and signal transmission, the electrical socket comprising: a socket housing having a plurality of passageways, each of the plurality of passageways receiving therein a contact configured to electrically contact a corresponding plug pin of a mating plug, the contacts of the plurality of passageways comprising at least one signal contact configured to communicate signal and a plurality of power contacts configured to transmit electrical power, wherein the plurality of power contacts comprise at least one power contact having a first polarity and at least one power contact having a second polarity opposite to the first polarity; and the plurality of passageways each extending from a first side to a second side of the socket housing.

Aspects of the disclosure also provides a method of manufacturing an electrical plug, the method comprising: providing a socket housing having a plurality of passageways, wherein each of the plurality of passageways extends from a first side to a second side of the socket housing; and disposing a plurality of contacts in the passageways, each of the plurality of contacts being configured to electrically contact a corresponding plug pin of a mating electrical plug, wherein the contacts comprise at least one signal contact configured to communicate signal and a plurality of power contacts configured to transmit electrical power, wherein the plurality of power contacts comprise at least one power contact having a first polarity and at least one power contact having a second polarity opposite to the first polarity.

Aspects of the disclosure also provides a method of manufacturing an electrical plug, the method comprising: disposing a plurality of contacts in a mold, each of the plurality of contacts being configured to electrically contact a corresponding plug pin of a mating electrical plug, wherein the contacts comprise at least one signal contact configured to communicate signal and a plurality of power contacts configured to transmit electrical power, and wherein the plurality of power contacts comprise at least one power contact having a first polarity and at least one power contact having a second polarity opposite to the first polarity; and molding the plurality of contacts with a socket housing and forming a plurality of passageways in the socket housing, wherein each of the plurality of passageways extends from a first side to a second side of the socket housing and receives therein at least one contact of the plurality of contacts.

Aspects of the disclosure also provides a battery assembly, comprising: at least one battery; and an electrical socket for power and signal transmission, the electrical socket comprising: a socket housing having a plurality of passageways, each of the plurality of passageways receiving therein a contact configured to electrically contact a corresponding plug pin of a mating plug, the contacts of the plurality of passageways comprising at least one signal contact configured to communicate signal and a plurality of power contacts configured to transmit electrical power, wherein the plurality of power contacts comprise at least one power contact having a first polarity and at least one power contact having a second polarity opposite to the first polarity; and the plurality of passageways each extending from a first side to a second side of the socket housing, wherein the electrical socket is connected to the battery assembly.

Aspects of the disclosure also provides an electrical connector for power and signal transmission, the electrical connector comprising: an electrical plug and an electrical socket, the electrical plug comprising: at least one signal pin configured to communicate signal; a plurality of power pins configured to transmit electrical power, wherein the plurality of power pins comprise at least one power pin having a first polarity and at least one power pin having a second polarity opposite to the first polarity; and a plug substrate configured to support the at least one signal pin and the plurality of power pins; the electrical socket comprising: a socket housing having a plurality of passageways, wherein the plurality of passageways are arranged corresponding to an arrangement of the at least one signal pin and the plurality of power pins of the electrical plug; and the plurality of passageways each extending from a first end to a second end of the socket housing, each of the plurality of passageways receiving therein a contact configured to electrically contact a corresponding signal pin and power pins of the electrical plug, the contacts of the plurality of passageways comprising at least one signal contact configured to communicate signal and a plurality of power contacts configured to transmit electrical power, wherein the plurality of power contacts comprise at least one power contact having a first polarity and at least one power contact having a second polarity opposite to the first polarity.

In some embodiments, a movable object may comprises: a body; one or more propulsion units carried by the body and configured to effect a moving of the movable object; a battery assembly; and an electrical connector as previously described, wherein the battery assembly is adapted to provide power to said one or more propulsion units via the electrical connector. In some embodiments, a power system may comprises: a battery assembly; a battery management device configured to managing a battery assembly; and an electrical connector as previously described, wherein the battery management device is adapted to electrically connect with the battery assembly via the electrical connector.

It shall be understood that different aspects of the invention can be appreciated individually, collectively, or in combination with each other. Various aspects of the invention described herein may be applied to any of the particular applications set forth below or for any other types of stationary or movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 4 is a top view of an electrical plug in accordance with an embodiment of the invention.

FIG. 5 is a bottom view of an electrical plug in accordance with an embodiment of the invention.

FIG. 6 is a side view of an electrical plug along a second direction in accordance with an embodiment of the invention.

FIG. 7 is a perspective view showing a first side of an electrical socket in accordance with an embodiment of the invention.

FIG. 8 is a perspective view of a second side of an electrical socket in accordance with an embodiment of the invention.

FIG. 9 is a side view of an electrical socket along a first direction in accordance with an embodiment of the invention.

FIG. 10 is a top view of an electrical socket in accordance with an embodiment of the invention.

FIG. 11 is a bottom view of an electrical socket in accordance with an embodiment of the invention.

FIG. 12 is a side view of an electrical socket along a second direction in accordance with an embodiment of the invention.

FIG. 16 is a top view of an electrical connector in accordance with an embodiment of the invention.

FIG. 17 is a bottom view of an electrical connector in accordance with an embodiment of the invention.

FIG. 18 is a side view of an electrical connector along a second direction in accordance with an embodiment of the invention.

FIG. 19 is a perspective view showing a first side of an electrical plug in accordance with another embodiment of the invention.

FIG. 20 is a perspective view of a second side of an electrical plug in accordance with another embodiment of the invention.

FIG. 21 is a side view of an electrical plug along a first direction in accordance with another embodiment of the invention.

FIG. 22 is a top view of an electrical plug in accordance with another embodiment of the invention.

FIG. 23 is a bottom view of an electrical plug in accordance with another embodiment of the invention.

FIG. 24 is a side view of an electrical plug along a second direction in accordance with another embodiment of the invention.

FIG. 25 is a perspective view showing a first side of an electrical socket in accordance with another embodiment of the invention.

FIG. 26 is a perspective view of a second side of an electrical socket in accordance with another embodiment of the invention.

FIG. 27 is a side view of an electrical socket along a first direction in accordance with another embodiment of the invention.

DETAILED DESCRIPTION

In an electrical system such as an unmanned aerial vehicle (UAV), electrical connectors can be employed for both power transmission and signal communication. For example, a battery assembly may be connected to the UAV body through an electrical connector in order to transmit both electrical power and battery control signals. The electrical connector can comprise an electrical plug having a plurality of pins and an electrical socket having a plurality of passageways which are arranged corresponding to the plurality of plug pins. In some embodiments, the pins of the plug comprise at least one signal pin, two or more positive power pins and two or more negative power pins. The plug pin configuration allows electrical current to be distributed over two or more power pins, such that a reliability of power transmission and an efficiency of heat dissipation are improved.

In some embodiments, the pins of the electrical plug can be disposed such that the positive power pins and the at least one signal pin are positioned on opposite sides of the negative power pins. In some instances, the negative power pins can be provided longer than the positive power pins and the at least one signal pin, such that the negative power pins are grounded before the positive power pins are connected to the socket. The plug pin configuration can prevent a sparking when connecting the plug to the socket. In some embodiments, the plurality of power pins and the at least one signal pin can comprise a first set of pins and a second set of pins which are disposed symmetrically opposite to each other, such that the plug can be connected to the corresponding socket in both a forward direction and a reverse direction.

In some embodiments, each of the passageways of the socket has an entrance extending on more than one side of a socket housing, for example, on two adjacent sides of the socket housing, such that the pins of the plug can be inserted into the passageways of the socket in more than one direction. In some instances, a positioning boss can be provided with the socket and assembled with a positioning groove of the plug, so as to ensure an accurate mating of the plug and the socket during assembling.

Figure 1:
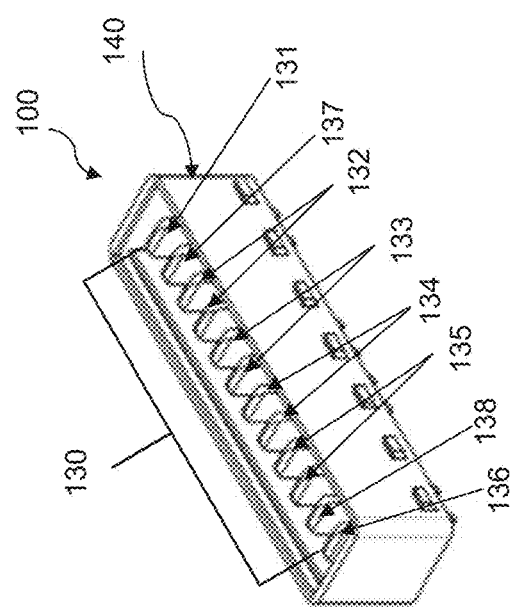
FIG. 1 is a perspective view showing a first side of an electrical plug in accordance with an embodiment of the invention.

FIG. 1 is a perspective view showing a first side of an electrical plug 100 in accordance with an embodiment of the invention. The first side can be a top side of the plug which is to be electrically coupled to a mating electrical socket. The electrical plug can comprise a plurality of pins 130. In some embodiments, the plurality of pins comprise at least one signal pin 131 configured to transmit signal and a plurality of power pins 132 and 133 configured to transmit electrical power.

In some embodiments, the plurality of power pins can comprise at least one power pin having a first polarity and at least one power pin having a second polarity which is opposite to the first polarity. The first polarity can be a positive polarity, and the second polarity can be a negative polarity. In some instances, the at least one power pin having a positive polarity may carry thereon a positive voltage, and the at least one power pin having a negative polarity may be connected to ground. In some embodiments, the plurality of power pins comprise two or more pins having a positive polarity (e.g., "positive power pins") and two or more pins having a negative polarity (e.g., "negative power pins"). In some instances, the number of the positive power pins can be same with the number of the negative power pins. Alternatively, the number of the positive power pins can be different from the number of the negative power pins.

In an electrical plug having two or more positive power pins and two or more negative power pins, the electrical current can be distributed over the plurality of power pins, such that a reliability of power transmission and an efficiency of heat dissipation can be improved as compared to a configuration in which one positive pin and one negative pin are provided. The electrical current can be evenly distributed over the plurality of power pins. For instance, in an electrical plug having two positive power pins, a 16 A electrical current can be evenly distributed over the two positive power pins, such that each positive power pin transmits an 8 An electrical current. In an electrical plug having two or more positive power pins and two or more negative power pins, if one or more positive power pins or one or more negative power pins fails, the electrical current can be evenly distributed over the remaining power pins.

The plurality of power pins can comprise a power pin 137 which is configured to output a constant voltage. For instance, the constant voltage can be used to power a particular electrical component. In some instances, the constant voltage is 18V.

In some embodiments, the at least one signal pin of the electrical plug can be two or more signal pins. The voltage carried on the signal pin can be a positive voltage. For instance, the at least one signal pin comprises at least one signal pin for transmitting signal and at least one signal pin for receiving signal. Alternatively, the signal may be transmitted and received by one single signal pin. In some instances, the signal is a digital signal. Alternatively, the signal is an analog signal.

In some embodiments, the at least one signal pin of the electrical plug can comprise a signal pin 138 which is configured to detect a connecting status of the electrical plug to another component. For instance, the at least one signal pin of the electrical plug can comprise a signal pin which is configured to detect if the electrical plug is electrical connected to a mating electrical socket which is coupled to a battery. The electrical plug can comprise a switch which is configured to control an electrical conductivity of the electrical plug. For instance, if the switch is turned off, electrical power and signal are not transmitted through the electrical plug.

The electrical plug can be employed to transmit both electrical power and data communication. For example, the electrical plug can be provided on a UAV body to provide an electrical connection to a power source such as a battery assembly. Electrical power can be transmitted from the battery assembly to electrical components, which are carried onboard the UAV, through the electrical plug. The electrical components onboard the UAV can include propulsion means such as electrical motors, payloads such as a gimbal, and various sensors such as a camera, an inertial sensor and an ultrasonic sensor. Meanwhile, signals can be communicated between the battery assembly and the electrical components onboard the UAV through the electrical plug. The signals transmitted from the battery assembly to the electrical components onboard the UAV can be signals indicative of a voltage, a current, a life time, a cycle number, a rate of voltage drop and a temperature of the battery assembly. The signals transmitted from the electrical components onboard the UAV to the battery assembly can be an instruction signal to shut down a battery cell, a polling signal to check a status of battery assembly and a discharging signal to maintain a battery cell.

For another example, the electrical plug can be provided on a battery management device for managing a battery assembly. The battery management device can comprise a battery management circuit which is to be electrically connected to the battery assembly and can be configured to manage the battery assembly. For instance, the battery management circuit can be configured to charge and/or discharge the battery assembly, and/or to detect a status of the battery assembly. The electrical plug can be provided with the battery management circuit and can be configured to electrically couple to a corresponding socket of the battery assembly.

The plurality of power pins can have a substantially rectangular shape. The plurality of power pins can be identical in dimension and/or shape. For instance, each of the power pins can have a length ranging from 5 mm to 10 mm. The plurality of power pins can be made from a metal material including a copper, an iron, or an alloy thereof. In some embodiments, the power pins are made from copper and coated with gold layer. The maximum current carrying capacity of each of the power pins can range from 5 A to 20 A. In some embodiments, the maximum current carrying capacity of each of the power pins is 15 A.

The signal pins can be identical in dimension and/or shape if more than two signal pins are provided on the plug. In some instances, the at least one signal pin can have a length ranging from 5 mm to 10 mm. In some embodiments, the at least one signal pin has the same dimension and/or shape with the plurality of power pins.

The at least one signal pin can be made from a metal material including a copper and an iron. The at least one signal pin may be coated with a coating layer. The coating layer can be made from gold, silver, or an alloy thereof. The at least one signal pin can be made from the same metal material with the power pins. In some embodiments, the at least one signal pin is made from copper and coated with gold layer.

The plurality of power pins can be aligned in a same row. Alternatively, the plurality of power pins can be staggered. For instance, the two or more positive power pins can be aligned in a row which is different from a row in which the negative power pins are aligned. The at least one signal pin and the plurality of power pins can be aligned in a same row. Alternatively, the at least one signal pin and the plurality of power pins can be staggered. For instance, the two or more signal pins can be aligned in a row which is different from a row in which the plurality of power pins are aligned.

A spacing between the positive power pins can range from 1 mm to 3 mm. A spacing between the negative power pins can range from 1 mm to 3 mm. A spacing between the signal pins can range from 1 mm to 3 mm if more than two signal pins are provided. A spacing between the positive power pins can be identical to a spacing between the negative power pins. A spacing between the power pins can be identical to a spacing between the signal pins. In some embodiments, a spacing between the pins is 2.5 mm.

The electrical plug can be provided with various shapes and dimensions in accordance with applications thereof. The plug can be provided with in a substantially rectangular shape having a length ranging from 10 mm to 60 mm, a width ranging from 3 mm to 20 mm and a height ranging from 5 mm to 20 mm. In an embodiment, the plug is provided with in a substantially cubic shape having a length of 33 mm, a width of 5.8 mm and a height of 6.45 mm. In another embodiment, the plug is provided with in a substantially cubic shape having a length of 30 mm, a width of 6.4 mm and a height of 6.8 mm.

Figure 2:
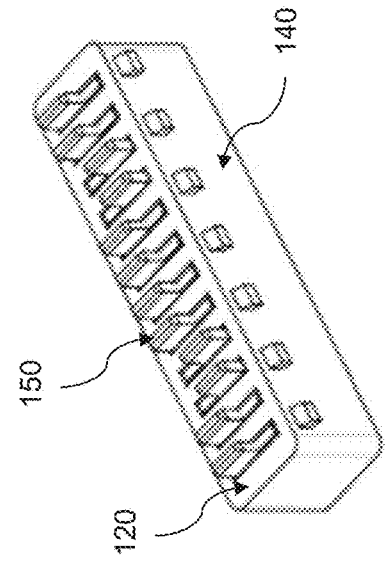
FIG. 2 is a perspective view showing a second side of an electrical plug in accordance with an embodiment of the invention.

FIG. 2 is a perspective view showing a second side of an electrical plug in accordance with an embodiment of the invention. The second side can be a bottom side of the plug which is to be electrically coupled to a circuit board or a cable. The plug can comprise a plug substrate configured to support the at least one signal pin and the plurality of power pins. The plug substrate can be made from an electrically insulating and flame resistant material. For instance, the plug substrate can be made from an electrically insulating material such as a resin or a mixture of materials. In some embodiments, the plug substrate is made from a mixture of PET and glass fiber, a mixture of PBT and glass fiber, or a mixture of LCP and glass fiber.

The plug substrate can include a base 120. In some embodiments, the plug substrate further includes a plurality of side walls 140 which stand from the base, define an internal space of the plug and surround the plurality of power pins and the at least one signal pin. Alternatively, the plug substrate does not include the plurality of side walls. The plurality of side walls can include four side walls such that the internal space thus formed is a substantially cubic space. The internal space of the plug can receive therein at least a portion of a mating electrical socket of the plug. A height of the plurality of power pins and at least one signal pin can be less than a height of the side walls, such that the power pins and at least one signal pin are prevented from being erroneously touched by an external object.

A first end of the plurality of power pins and the at least one signal pin can be exposed from a first side of the plug substrate, and a second end of the plurality of power pins and the at least one signal pin can be exposed from a second side of the plug substrate. In some instances, the first side of the plug substrate can be opposite to the second side of the plug substrate. Alternatively, the first side of the plug substrate can be adjacent to the second side of the plug substrate. For example, the plug substrate has a top side to which a mating socket is assembled, and a bottom side to which a circuit or a cable is attached. The first end of the power pins and the signal pin can be a contacting portion which is configured to electrically connect with a mating electrical socket. The contacting portion can be exposed from the top side of the plug substrate, such that the contacting portion is at least partially received in the internal space of the plug defined by the plurality of side walls of the plug substrate. The second end of the power pins and the signal pin can be a tip portion 150 which is configured to electrically connect to a circuit board or a cable. The tip portion can be exposed from the bottom side of the plug substrate, such that the second end being electrically coupled to a circuit board or a cable. In some instances, the tip portion can be a soldering portion to be soldered onto a circuit board such as a printed circuit board. Alternatively, the tip portion can be an insertion portion which is to be inserted into a connecting socket or a connecting hold provided on a circuit board or a cable. The tip portion can be shaped into various configurations. For instance, the tip portion can have one, two or more tapered parts. In an embodiment, the tip portion is provided in a shape of folk having to tapered branches.

The tip portion of the power pins and the signal pin can have a reduced width than other parts of the power pins and the signal pin. The reduced width can facilitate an electrically coupling of the plug to a circuit board or a cable. For instance, the tip portion having a reduced width can facilitate a soldering onto a circuit board or inserted into a receiving socket. In some instances, the tip portion of the plug pins can stagger in a row. In other words, the tip portion of the plug pins can be arranged alternatively in a row.

Figure 3:
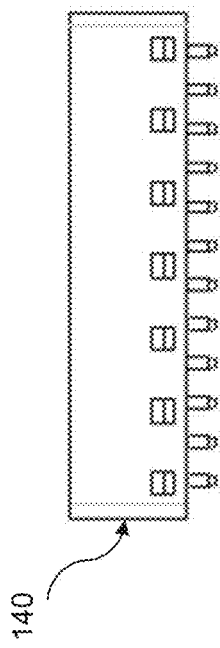
FIG. 3 is a side view of an electrical plug along a first direction in accordance with an embodiment of the invention.

FIG. 3 is a side view of an electrical plug along a first direction in accordance with an embodiment of the invention. The first direction can be a longitudinal direction of the plug with respect to a width direction. The first end of the power pins and the signal pin, which is the contacting portion, can be received in the internal space of the plug defined by the plurality of side walls 140. The second end of the power pins and the signal pin, which is the tip portion, can be exposed from the bottom side of the plug substrate. The tip portion of the power pins and the signal pin can be electrically coupled to a circuit board or a cable. For instance, the tip portion can be soldered to a circuit board or a cable or inserted into a receiving socket.

FIG. 4 is a top view of an electrical plug in accordance with an embodiment of the invention. The plug can comprise a plurality of pins aligned in a row. The plurality of pins can comprise at least one signal pin 131 configured to transmit data and a plurality of power pins 132 and 133 configured to transmit electrical power. The plurality of power pins can include at least one positive power pin and at least one negative power pin. In some instances, the number of positive power pins can be equivalent to the number of negative power pins. Alternatively, the number of positive power pins can be different from the number of negative power pins. In some embodiments, the plurality of power pins include two positive power pins 133 and two negative power pins 132. The plurality of pins can be received in an internal space of the plug defined by a plurality of side walls 140.

In some embodiments, the positive power pins and the at least signal pin are disposed on opposite sides of the negative power pins. In other words, the negative power pins can be provided to separate the positive power pins and the at least one signal pin. The negative power pins can be grounded such that a voltage thereon is zero. The positive power pins and the signal pin can carry positive voltage. A spatial separation of the positive power pins and the signal pin by the negative power pins can prevent a false electrical connection between the positive power pins and the signal pin which may lead to a damage to the electrical system. A spatial separation of the positive power pins and the signal pin by the negative power pins can also prevent an electric spark between the positive power pins and the signal pin. In some instances, insulating spacers can be provided between the negative power pins and the signal pin and between the negative power pins and positive power pins. The physical separation between the negative power pins and the signal pin and between the negative power pins and positive power pins can prevent a false electrical connection between the pins.

The plurality of pins of the plug can comprise a second set of pins in addition to the first set of pins 131-133. The second set of pins can be provided in a same row with the first set of pins in the internal space of the plug. An insulating spacer can be provided between the first and second sets of pins. The second set of pins can have the same electrical and physical characteristics with the first set of pins. A spacing between pins in the second set can be identical to a spacing between pins in the first set. In some instances, a spacing between the first set of pins and the second set of pins can be identical to a spacing between pins of the first set. Alternatively, a spacing between the first set of pins and the second set of pins can be larger than a spacing between pins of the first set.

The second set of pins can include at least one signal pin configured to transmit data and a plurality of power pins configured to transmit electrical power. In some embodiments, the second set of pins comprise at least one signal pin 136 configured to transmit data and a plurality of power pins 134 and 135 configured to transmit electrical power. The plurality of power pins can include two positive power pins 134 and two negative power pins 135. In the second set of pins, the positive power pins and the at least signal pin can be disposed on opposite sides of the negative power pins. Each of the pins in the second set can be electrically connected to a corresponding pin in the first group. For instance, the signal pin in the second set can be electrically connected to the signal pin in the first set, the positive power pins in the second set can be electrically connected to the positive power pins in the first set, and the negative power pins in the second set can be electrically connected to the negative power pins in the first set.

The first and second sets of pins can be arranged symmetrically opposite to each other on the plug substrate. For instance, as shown in FIG. 4, the pins in the first set can be arranged as a signal pin, negative power pins and positive pins in a right to left direction, and the pins in the second set can be arranged as positive pins, negative power pins and a signal pin in a right to left direction. Since the pins in the second set are electrically connected to the corresponding pins in the first set, the symmetrical arrangement of pins can allow the plug being inserted into a mating socket in two opposite orientations, without any needs to determining a correct insertion orientation.

The electrical plug can comprise a positioning groove 160. The plurality of power pins and the at least one signal pin can be provided within the positioning groove. The positioning groove of the plug can be a part of the internal space of the plug defined by sidewalls. For instance, the positioning groove can be the part of the internal space of the plug that is not occupied by the pins. The positioning groove of the plug can be assembled with a positioning boss of a mating socket. For instance, the positioning groove of the plug can receive therein a positioning boss of a mating socket, such that the plug can be accurately assembled into the mating socket for electrical coupling.

FIG. 5 is a bottom view of an electrical plug in accordance with an embodiment of the invention. The tip portion 150 having a reduced width of the plug pins, which exposes from the bottom side of the plug substrate 120, can stagger in a row. In other words, the tip portion of the plug pins may not align in the same row. In case a second set of pins are provided in addition to a first set of pins as discussed hereinabove, the staggering arrangement of the tip portion in the second set of pins can be symmetrical with respect to that of the first set of pins. The staggering arrangement of the tip portion can prevent a false electrical connection between the signal pin and the negative power pins and between the negative power pins and the positive power pins, and can provide more space for a soldering process when coupling the plug to a circuit board.

The plug can comprise at least one post (not shown in FIG. 5) protruding from the plug substrate on a bottom side of the plug substrate. The bottom side of the plug substrate can be the side to which the plug is electrically coupled to an electrical component or a circuit board. The at least one post can be inserted into a corresponding hole on the circuit board or soldered onto the circuit board when coupling the plug onto a circuit board, such that an accurate mating between the plug and the circuit board is ensured.

FIG. 6 is a side view of an electrical plug along a second direction in accordance with an embodiment of the invention. The second direction can be a width direction of the plug with respect to a longitudinal direction. The first end of the power pins and the signal pin, which is the contacting portion, can be received in the internal space of the plug defined by the plurality of side walls 140. The second end of the power pins and the signal pin, which is the tip portion 150, can be exposed from the bottom side of the plug substrate. The tip portion of the power pins and the signal pin can be electrically coupled to a circuit board or a cable.

FIG. 7 is a perspective view showing a first end of an electrical socket 200 in accordance with an embodiment of the invention. The first side can be a top side of the socket. The socket can be electrically coupled to a circuit board or a cable at the first side. FIG. 8 is a perspective view of a second end of an electrical socket in accordance with an embodiment of the invention. The second end can be opposite to the first end. The second side can be a bottom side of the socket. The socket can be electrically coupled to a mating plug at the second side. The electrical socket can be provided with various shapes and dimensions in accordance with applications thereof. The socket can be provided with in a substantially rectangular shape having a length ranging from 10 mm to 60 mm, a width ranging from 3 mm to 20 mm and a height ranging from 5 mm to 20 mm. In an embodiment, the socket is provided with in a substantially cubic shape having a length of 39.4 mm, a width of 12.4 mm and a height of 9.2 mm.

The electrical socket for transmitting power and signal can comprise a socket housing 210 having a plurality of passageways 220. The socket housing can be made from an electrically insulating material such as a resin or a mixture of materials. The material for socket housing can be flame resistant. In some embodiments, the socket housing is made from a mixture of PET and glass fiber, a mixture of PBT and glass fiber, or a mixture of LCP and glass fiber.

The socket housing can include a plurality of side walls 230 surrounding the plurality of passageways. For instance, the socket housing can include four side walls to form a substantially cubic socket housing. Each of the plurality of passageways can extend from the first side to the second side of the socket housing. In some instances, the first side can be opposite to the second side. For instance, the plurality of passageways can extend from the top side to bottom side of the socket housing. Alternatively, the first side can be adjacent to the second side and intersect with the second side. For instance, the plurality of passageways can extend from the top side to an adjacent lateral side of the socket housing. The plurality of passageways can be provided parallel to each other. The plurality of passageways can be arranged in accordance with the pins of a mating electrical plug, and configured to engage with corresponding plug pins of the mating electrical plug. For instance, the pins of a mating electrical plug can be inserted into the plurality of passageways.

Each of the plurality of passageways can receive therein a contact configured to electrically contact a corresponding plug pin of a mating plug. The contacts received in the plurality of passageways can comprise at least one signal contact configured to communicate signal and a plurality of power contacts configured to transmit electrical power. The plurality of power contacts can comprise at least one power contact having a first polarity and at least one power contact having a second polarity opposite to the first polarity. For instance, the plurality of power contacts can comprise at least one power contact having a positive polarity and at least one power contact having a negative polarity. The at least one power contact having a positive polarity can electrically contact with corresponding positive pin of a mating electrical plug, and the at least one power contact having a negative polarity can electrically contact with corresponding negative pin of a mating electrical plug, when the electrical socket is assembled with the mating electrical plug.

Each of the plurality of passageways can receive a clamping component therein. The clamping component can be configured to firmly clamp a pin of the mating electrical plug. For instance, the clamping component can include one or more protrusions which firmly abut again a plug pin. For another instance, the clamping component can includes one or more clips which firmly grip a plug pin. The clamping components can be made from conductive material such as metal, such that an electrical connection can be established between the pins of the mating plug and the clamping components.

The electrical socket can comprise a boss 240. The boss can be provided in an internal space 270 of the socket defined by the side walls. The plurality of passageways can be provided in the boss. The part of internal space of the socket not occupied by the boss can receive side walls of a mating plug. For instance, when a plug shown in FIG. 1 is inserted to the socket, the side walls of the plug substrate can be received in the part of the internal space of the socket not occupied by the boss, and the boss can be received in the positioning groove 160. The boss of the socket can regulate and guide an inserting of a mating plug into the socket. For instance, an inserting of the mating plug into the socket can be guided by the boss of the socket and the side walls of the mating plug.

The electrical socket can comprise a plurality of socket pins 250 on the first side. For instance, the plurality of socket pins can be provided on the top side of the socket. The plurality of socket pins can be aligned in a row. A first portion of the plurality of socket pins can protrude from the plurality of passageways and expose from the top side of the socket, and a second portion of the plurality of socket pins can be received in the plurality of passageways. The socket pins can be made from conductive material such a metal.

The first portion of the plurality of socket pins, which are exposed from the top side of the socket, can be a tip portion which is configured to electrically connect to an electrical component, a circuit board or a cable. For instance, the tip portion of the socket pins can be soldered to a printed circuit board for electrical connection. The tip portion can have a reduced width than the other portion of the socket pins. The second portion of the plurality of socket pins, which are received in the plurality of passageways, can be configured to electrically connect with corresponding contacts which are received in the passageways and configured to electrically contact a corresponding plug pin of a mating plug, when the mating electrical plug is inserted into the socket. In some instances, the second portion of the plurality of socket pins, which are received in the plurality of passageways, can be integral with corresponding contacts which are received in the passageways. In some instances, the second portion of the plurality of socket pins can be electrically coupled to the clamping components provided in the passageways. For instance, the pins of a mating plug can be firmly held in the passageways of the socket by the clamping components, and electrically coupled to the second portion of the plurality of socket pins within the passageways.

The electrical socket can comprise at least one post 260 which protrudes from the first side of the socket housing. For instance, the at least one post can be provided and protrudes from the top side of the socket housing. The top side of the socket housing can be the side to which the socket is electrically coupled to an electrical component or a circuit board. The at least one post can be provided aligning with the plurality of socket pins. The at least one post can be used to position and align the socket when coupling the socket to an electrical component or a circuit board. For instance, the at least one post can be inserted into a corresponding hole on a circuit board when coupling the socket onto the circuit board, such that an accurate mating between the socket and the circuit board is ensured. For another instance, the at least one post can be soldered onto a circuit board when coupling the socket onto the circuit board.

FIG. 9 is a side view of an electrical socket along a first direction in accordance with an embodiment of the invention. The first direction can be a longitudinal direction of the socket with respect to a width direction. A plurality of socket pins 250 are provided at the top side of the socket housing 210. In some instances, two posts 260 are provided on the top side of the socket, each of which being positioned at a longitudinal side of the socket housing such that the socket pins are located between the two posts. The socket pins and the two posts can be aligned in a row.

FIG. 10 is a top view of an electrical socket in accordance with an embodiment of the invention. FIG. 11 is a bottom view of an electrical socket in accordance with an embodiment of the invention. A plurality of socket pins 250 can be provided on the top side of the socket housing 210. A plurality of passageways 220 can be provided in the boss 240 in accordance with the arrangement of corresponding pins of a mating plug. The internal space of the socket, which is defined by side walls of the socket housing and not being occupied by the boss, can receive side walls of a mating plug when the mating plug is inserted into the socket. The boss of the socket can regulate and guide an inserting of a mating plug into the socket. For instance, an inserting of the mating plug into the socket can be guided by the boss of socket and the side walls of the mating plug.

One or more posts 260 can be provided to protrude from the top side of the socket housing. The top side of the socket housing can be the side to which the socket is electrically coupled to an electrical component or a circuit board. In some instances, two posts are provided aligning with the plurality of socket pins, each being disposed at a longitudinal end of the socket housing. The one or more posts can be inserted into a corresponding hole on a circuit board when coupling the socket onto the circuit board, such that an accurate mating between the socket and the circuit board is ensured.

FIG. 12 is a side view of an electrical socket along a second direction in accordance with an embodiment of the invention. The second direction can be a width direction of the socket with respect to a longitudinal direction. A first portion of the plurality of socket pins 250 can protrude from the top side of the socket housing 210, and a second portion of the plurality of socket pins can be received in the corresponding one of the passageways. The second portion of the plurality of socket pins can be electrically coupled to a corresponding pin of a mating plug when the pins are inserted into the passageways of the socket. One or more posts 260 can be provided to protrude from the top side of the socket housing to ensure an accurate mating between the socket and an electrical component or a circuit board.

Figure 14:
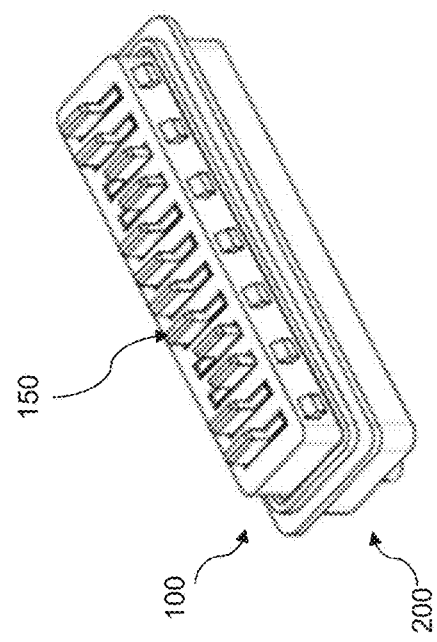
FIG. 14 is a perspective view of a second side of an electrical connector in accordance with an embodiment of the invention.
Figure 13:
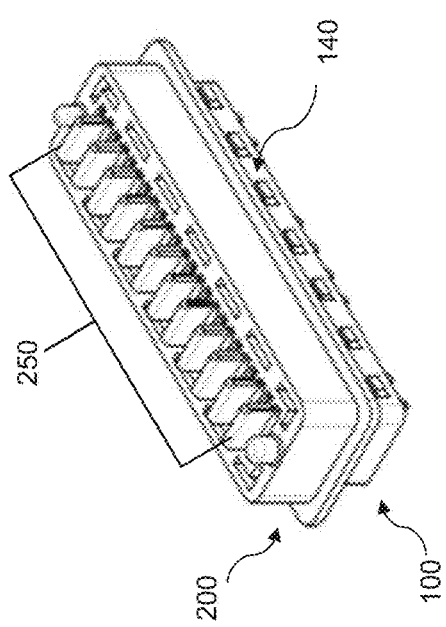
FIG. 13 is a perspective view showing a first side of an electrical connector in accordance with an embodiment of the invention.
Figure 15:
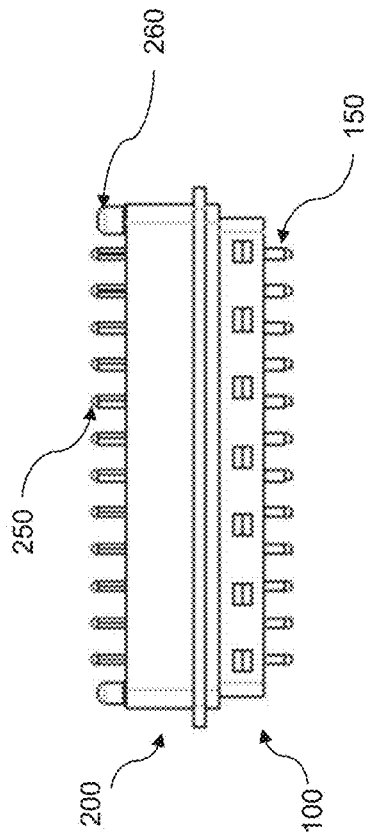
FIG. 15 is a side view of an electrical connector along a first direction in accordance with an embodiment of the invention.

FIG. 13 is a perspective view showing a first side of an electrical connector in accordance with an embodiment of the invention. The electrical connector shown in FIG. 13 can comprise an electrical plug 100 shown in FIGS. 1-6 and an electrical socket 200 shown in FIGS. 7-12, in which the electrical plug is inserted into the electrical socket from a bottom side of the electrical socket. The first side of the connector can be a top side of the connector, which is the top side of the socket on which the socket pins 250 are provided. FIG. 14 is a perspective view of a second side of an electrical connector in accordance with an embodiment of the invention. The second side of the connector can be a bottom side of the connector, which is the bottom side of the plug on which the tip portion 150 of the plug pins of the plug are exposed. FIG. 15 is a side view of an electrical connector along a first direction in accordance with an embodiment of the invention. The first direction can be a longitudinal direction of the connector with respect to a width direction. The socket pins and the tip portion of the plug pins can be respectively electrical coupled to a circuit board or a cable, such that two circuit board or two cables can be electrical connected through the electrical connector.

When the plug is coupled with the socket, the plurality of pins 130 of the plug can be inserted into corresponding passageways 220 of the socket. For instance, at least a portion of the contacting portion of the plurality of pins can be inserted into corresponding passageways of the socket. In some embodiments, at least a portion of the contacting portion of the plurality of pins can be firmly clamped by the clamping component which is provided in each of the passageways. An electrical path can be formed between the tip portion of the plurality of power pins and at least one signal pin of the plug and the socket pins of the socket when the plug is coupled with the socket, such that the plug and the socket are electrically connected with each other.

In some embodiments, a portion of the plug can be received in the socket when plug is coupled with the socket. For instance, at least a portion of the side walls 140 of the plug can be received in the part of internal space. An insertion process of the plug into the socket can be regulated and guided by a mating between the positioning boss of the socket and the positioning groove of the plug, such that an accurate assembling of the plug with the socket can be ensured. For instance, the positioning boss of the socket can be clearance fit with the positioning groove of the plug if the plug is properly assembled into the socket. Upon completion of assembling the plug with the socket, at least a portion of the positioning boss of the socket can be received in the positioning groove of the plug.

A locking mechanism can be provided to secure a firm assembling between the plug and the socket. The locking mechanism between the plug and the socket can be releasable, for example, a user can intentionally detach the plug from the socket if necessary. For instance, at least one protrusion can be provided on an outer face of the side walls of the plug, and at least one corresponding recess can be provided on an inner face of the side walls of the socket. When the plug is properly inserted into the socket, the at least one protrusion can be pushed into the corresponding recess, such that the plug is prevented from unexpected detaching from the socket. For another instance, at least one protrusion can be provided on an inner face of the side walls of the socket, and at least one corresponding recess can be provided on an outer face of the side walls of the plug.

FIG. 16 is a top view of an electrical connector in accordance with an embodiment of the invention. A plurality of socket pins 250 can be provided on the top side of the socket housing 210. The socket pins can be electrical coupled to a circuit board or a cable. For instance, the socket pins can be soldered to a battery assembly. One or more posts 260 can be provided to protrude from the top side of the socket housing. In some instances, two posts are provided aligning with the plurality of socket pins, each being disposed at a longitudinal end of the socket pins. The one or more posts can be inserted into a corresponding hole on a circuit board or soldered onto the circuit when coupling the socket onto the circuit board, such that an accurate mating between the socket and the circuit board is ensured.

FIG. 17 is a bottom view of an electrical connector in accordance with an embodiment of the invention. The tip portion 150 of the plurality of pins of the plug can be exposed from the bottom side of the plug substrate 120. In some instances, the tip portion of the plug pins can have a reduced width than the contacting portion of the plug pins and can stagger in a row. The staggering arrangement of the tip portion can prevent an unwanted electrical connection between the power pins and the signal pins of the plug, and can provide more space for a soldering process when coupling the plug to a circuit board.

FIG. 18 is a side view of an electrical connector along a second direction in accordance with an embodiment of the invention. The second direction can be a width direction of the connector with respect to a longitudinal direction. The electrical plug 100 can be assembled with the electrical socket 200, for example, at least a portion of the plug is received in the socket. Electrical components, which are respectively coupled to the tip portion 150 of the power pins and the signal pin of the plug and the socket pins 250 of the socket, can be electrically coupled with each with through the connector. For instance, by assembling the plug into the socket, the connecting portion of the power pins and the signal pin(s) of the plug can be inserted into the passageways of the socket and electrically coupled with the socket pins of the socket, such that an electrical connection can be provided between the tip portion of the power pins and the signal pin of the plug and the socket pins of the socket.

FIG. 19 is a perspective view showing a first side of an electrical plug in accordance with another embodiment of the invention. The first side can be a top side of the plug which is to be electrically coupled to a mating electrical socket. The electrical plug can comprise a plurality of pins 330. The plurality of pins comprise at least one signal pin configured to transmit signal and a plurality of power pins configured to transmit electrical power. The plug can comprise a plug substrate 320 configured to support the at least one signal pin and the plurality of power pins.

In some embodiments, the at least one signal pin can comprise at least two signal pins. For instance, the at least one signal pin can comprise two signal pins, one for transmitting signals and one for receiving signals. The voltage carried on the signal pin can be a positive voltage. In some embodiments, the plurality of power pins can comprise at least one power pin having a first polarity and at least one power pin having a second polarity which is opposite to the first polarity. The first polarity can be a positive polarity, and the second polarity can be a negative polarity. In some embodiments, the plurality of power pins comprise two or more pins having a positive polarity (e.g., "positive power pins") and two or more pins having a negative polarity (e.g., "negative power pins"). In some embodiments, the plug comprises at least one post 370 protruding from the plug substrate on the top side of the plug. The at least one post can be provided aligning with the plurality of power pins and at least one signal pin. In some instances, two posts are respectively provided at two longitudinal ends of the plug substrate. The at least one post can function as a positioning and guiding component when the plug is assembled with the socket. For instance, the at least one post can be aligned with a corresponding hole of a mating electrical socket and then inserted into a corresponding hole of a mating electrical socket when the plug is assembled with the socket, such that a correct aligning and assembling are ensured.

In some embodiments, the plug substrate has no side walls which stand from the plug substrate and surround the plurality of power pins and the at least one signal pin. In other words, the plurality of power pins and the at least one signal pin can be exposed from the plug substrate on the top side of the plug.

FIG. 20 is a perspective view of a second side of an electrical plug in accordance with another embodiment of the invention. The second side can be a bottom side of the plug which is to be electrically coupled to a circuit board or a cable. A first end of the plurality of power pins and the at least one signal pin can be exposed from a first side of the plug substrate, and a second end of the plurality of power pins and the at least one signal pin can be exposed from a second side of the plug substrate. In some instances, the first side of the plug substrate can be opposite to the second side of the plug substrate. For instance, the first side of the plug substrate can be the top side of the plug substrate, and the second side of the plug substrate can be the bottom side of the plug substrate. Alternatively, the first side of the plug substrate can be adjacent to the second side of the plug substrate. For instance, the first side and second side of the plug substrate can intersect with each other.

The first end of the power pins and the signal pin can be a contacting portion 330 which is configured to electrically connect with a mating electrical socket. The contacting portion can be exposed from the top side of the plug substrate. The second end of the power pins and the signal pin can be a tip portion 350 which is configured to electrically connect to a circuit board or a cable. The tip portion can be exposed from the bottom side of the plug substrate, such that the second end being electrically coupled to a circuit board or a cable. In some instances, the tip portion can be a soldering portion to be soldered onto a circuit board such as a printed circuit board. Alternatively, the tip portion can be an insertion portion which is to be inserted into a connecting socket or a connecting hold provided on a circuit board or a cable. The tip portion can be shaped into various configurations. In an embodiment, each of the tip portion is provided in a shape of folk having to tapered branches. The tip portion can be aligned in a same row.

At least one post 380 can be provided on the bottom side of the plug substrate. The at least one post can be used to position and align the plug when coupling the plug to an electrical component or a circuit board. For instance, the at least one post can be inserted into a corresponding hole on a circuit board when coupling the plug onto the circuit board, such that an accurate mating between the plug and the circuit board is ensured. For another instance, the at least one post can be soldered onto a circuit board when coupling the plug onto the circuit board. In some embodiments, two posts are provided on the bottom side of the plug substrate, each of which is positioned at a longitudinal end of the plug substrate. The at least one post can be aligned in a row with the tip portion of the plurality of pins of the plug.

FIG. 21 is a side view of an electrical plug along a first direction in accordance with another embodiment of the invention. The first direction can be a longitudinal direction of the plug with respect to a width direction. The contacting portion 330 and the tip portion 350 of the plurality of pins of the plug can be provided at opposite sides of the plug substrate. Among the plurality of pins of the plug, the negative power pins can have a longer length than the positive power pins and the at least one signal pin in the contacting portion. For instance, the negative power pins 332 can extend longer than the positive power pins 333 and the at least one signal pin 331 from the top side of the plug substrate. When the plug is inserted into a mating socket, the longer negative pins can be connected to electrically corresponding socket pins which are electrically grounded, before the positive power pins and the at least one signal pin are electrically connected to corresponding socket pins. This plug pin configuration can prevent an electric spark when the positive power pins and the at least one signal pin, both of which carry a positive signal, are electrically connected to corresponding socket pins, because the plug is electrically grounded before the positive power pins and the at least one signal pin are connected to the socket. The negative power pins can have a longer length ranging from 0.1 mm to 10 mm than the positive power pins and the at least one signal pin from the top side of the plug substrate. In an embodiment, the negative power pins has a longer length ranging from 0.6 mm than the positive power pins and the at least one signal pin from the top side of the plug substrate. In another embodiment, the negative power pins has a longer length ranging from 0.8 mm than the positive power pins and the at least one signal pin from the top side of the plug substrate.

The positive power pins and the at least signal pin are disposed on opposite sides of the negative power pins. A spatial separation of the positive power pins and the signal pin by the negative power pins can prevent a false electrical connection and an electric spark between the positive power pins and the signal pin which may lead to a damage to the electrical system. The plurality of pins of the plug can comprise a second set of pins 334-336 in addition to the first set of pins 331-333. The first and second sets of pins can be arranged symmetrically opposite to each other on the plug substrate. For instance, pins 334 can be positive power pins which are electrically connected to the positive power pins 333, pins 335 can be negative power pins which are electrically connected to the negative power pins 332, and pin 336 can be a signal pin which is electrically connected to the signal pins 331. The symmetrical arrangement of pins can allow the plug being inserted into a mating socket in two opposite orientations, without any needs to determining a correct insertion orientation.

FIG. 22 is a top view of an electrical plug in accordance with another embodiment of the invention. The pins 331-336 of the plug can be grouped into a first set of pins 331-333 and a second set of pins 334-336. The first and second sets of pins can be arranged symmetrically opposite to each other on the plug substrate. At least one post 370 can be on the top side of the plug substrate, functioning as a positioning and guiding component when the plug is assembled with the socket.

FIG. 23 is a bottom view of an electrical plug in accordance with another embodiment of the invention. The tip portion 350 having one or more tapered portions of the plurality of pins of the plug, which are exposed from the bottom side of the plug substrate 320, can be aligned in a row. FIG. 24 is a side view of an electrical plug along a second direction in accordance with another embodiment of the invention. The second direction can be a width direction of the plug with respect to a longitudinal direction. The contacting portion 330 and the tip portion 350 of the plurality of pins of the plug can be provided on opposite sides of the plug substrate. Alternatively, the contacting portion and the tip portion of the plurality of pins of the plug can be provided on adjacent sides of the plug substrate.

FIG. 25 is a perspective view showing a first side of an electrical socket 400 in accordance with another embodiment of the invention. The first side can be a top side of the socket. The socket can be electrically coupled to a circuit board or a cable at the first side. FIG. 26 is a perspective view of a second side of an electrical socket in accordance with another embodiment of the invention. The second side can be a bottom side of the socket. The socket can be electrically coupled to a mating plug at the second side.

The electrical socket for transmitting power and signal can comprise a socket housing 410. A plurality of passageways 420 can be provided on the socket housing, and extend from a first side to a second side of the socket housing. In some embodiments, the first side can be adjacent to the second side. For instance, the plurality of passageways can extend from the bottom side to an adjacent side of the socket housing. When a mating electrical plug is assembled with the socket, corresponding pins of the plug can be inserted into the passageways of the socket from at least two directions. For instance, the plurality of pins of the mating plug can be inserted into corresponding passageways of the socket from both a bottom side and an adjacent lateral side of the socket. The corresponding pins of the mating plug can also be inserted into the passageways of the socket from an arbitrary direction ranging from a direction of the bottom side to a direction of the adjacent lateral side of the socket. In some instances, the second portion of the plurality of socket pins can be electrically coupled to the clamping components provided in the passageways, which can firmly clamp the pins of a mating plug when the mating plug is assembled with the socket.

The electrical socket can comprise a plurality of socket pins 450 on the top side of the socket housing. The plurality of socket pins can be aligned in a row. A first portion of the plurality of socket pins can protrude from the top side of the socket, and a second portion of the plurality of socket pins can be received in the plurality of passageways. The first portion of the plurality of socket pins, which are exposed from the top side of the socket, can be a tip portion which is configured to electrically connect to an electrical component, a circuit board or a cable. The tip portion of the socket pins can be aligned in a line and can be shaped into various configurations. In an embodiment, the tip portion is provided in a shape of folk having to tapered branches. The second portion of the plurality of socket pins, which are received in the plurality of passageways, can be configured to electrically connect with corresponding pins of a mating electrical plug when the mating electrical plug is inserted into the socket.

The electrical socket can comprise at least one post 460 which protrudes from the top side of the socket housing. The at least one post can be provided at a longitudinal end of the socket housing. The at least one post can be used to position and align the socket when coupling the socket to an electrical component or a circuit board. For instance, the at least one post can be inserted into a corresponding hole on a circuit board when coupling the socket onto the circuit board, such that an accurate mating between the socket and the circuit board is ensured. For another instance, the at least one post can be soldered onto a circuit board when coupling the socket onto the circuit board.

FIG. 27 is a side view of an electrical socket along a first direction in accordance with another embodiment of the invention. The first direction can be a longitudinal direction of the socket with respect to a width direction. A plurality of socket pins 450 are provided at the top side of the socket housing 410. In some instances, two posts 460 are provided on the top side of the socket housing, each of which being positioned at a longitudinal end of the socket housing. The socket pins and the two posts can be aligned in a row. The two posts can be used to position and align the socket when coupling the socket to an electrical component or a circuit board.

Figure 28:
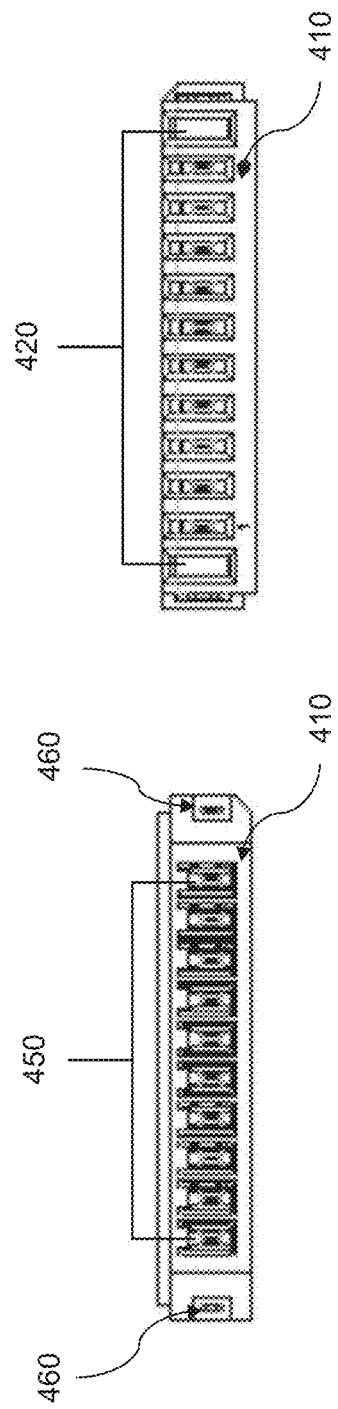
FIG. 28 is a top view of an electrical socket in accordance with another embodiment of the invention.
Figure 29:
FIG. 29 is a bottom view of an electrical socket in accordance with another embodiment of the invention.

FIG. 28 is a top view of an electrical socket in accordance with another embodiment of the invention. FIG. 29 is a bottom view of an electrical socket in accordance with another embodiment of the invention. A plurality of socket pins 450 can be provided on the top side of the socket housing 410. A plurality of passageways 420 can be provided on the socket housing in accordance with the arrangement of corresponding pins of a mating plug, and extend from the bottom side to an adjacent side of the socket housing. One or more posts 460 can be provided to protrude from the top side of the socket housing. In some instances, two posts are provided aligning with the plurality of socket pins, each being disposed at a longitudinal end of the socket housing.

Figure 30:
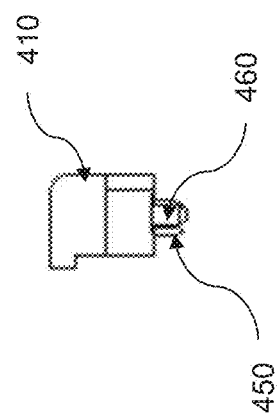
FIG. 30 is a side view of an electrical socket along a second direction in accordance with another embodiment of the invention.

FIG. 30 is a side view of an electrical socket along a second direction in accordance with another embodiment of the invention. The second direction can be a width direction of the socket with respect to a longitudinal direction. A first portion of the plurality of socket pins 450 can protrude from the top side of the socket housing 410, and a second portion of the plurality of socket pins can be received in the corresponding one of the passageways. The second portion of the plurality of socket pins can be electrically coupled to a corresponding pin of a mating plug when the pins of the plug are inserted into the passageways of the socket from at least two directions. One or more posts 460 can be provided to protrude from the top side of the socket housing to ensure an accurate mating between the socket and an electrical component or a circuit board.

Figure 32:
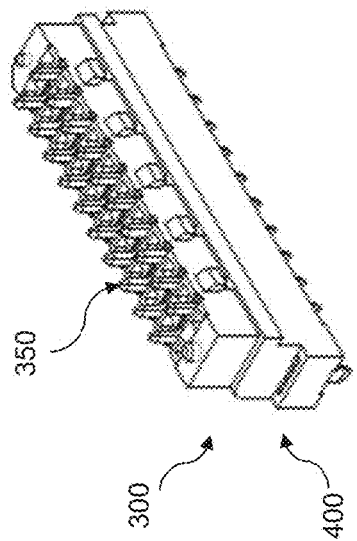
FIG. 32 is a perspective view of a second side of an electrical connector in accordance with another embodiment of the invention.
Figure 31:
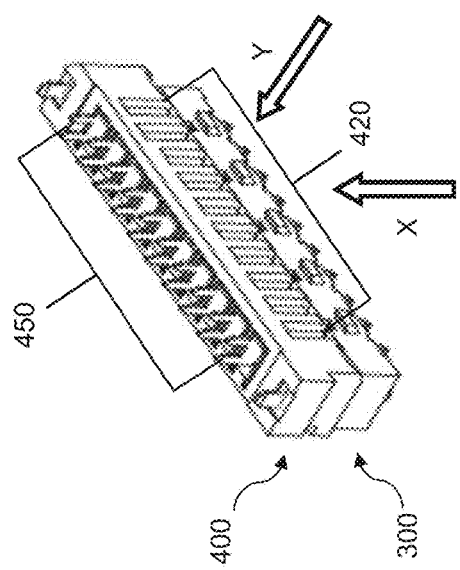
FIG. 31 is a perspective view showing a first side of an electrical connector in accordance with another embodiment of the invention.

FIG. 31 is a perspective view showing a first side of an electrical connector in accordance with another embodiment of the invention. The electrical connector shown in FIG. 31 can comprise an electrical plug 300 shown in FIGS. 19-24 and an electrical socket 400 shown in FIGS. 25-30, in which the electrical plug is inserted into the electrical socket from a bottom side of the electrical socket in an X direction. Alternatively, the electrical plug can be inserted into the electrical socket from a side of the electrical socket in a Y direction since the passageways 420 of the socket extend from the bottom side to an adjacent side of the socket housing. The first side of the connector can be a top side of the connector, which is the top side of the socket on which the socket pins 450 are provided. FIG. 32 is a perspective view of a second side of an electrical connector in accordance with another embodiment of the invention. The second side of the connector can be a bottom side of the connector, which is the bottom side of the plug on which the tip portion 350 of the plug pins of the plug are exposed. When the plug is coupled with the socket, the plurality of pins of the plug can be inserted into corresponding passageways of the socket from at least two directions. In some instances, at least a portion of the contacting portion of the plurality of pins can be firmly clamped by clamping components which are provided in each of the passageways. An electrical path can be formed between the tip portion of the plurality of pins of the plug and the socket pins of the socket when the plug is coupled with the socket, such that the plug and the socket are electrically connected with each other.

Figure 33:
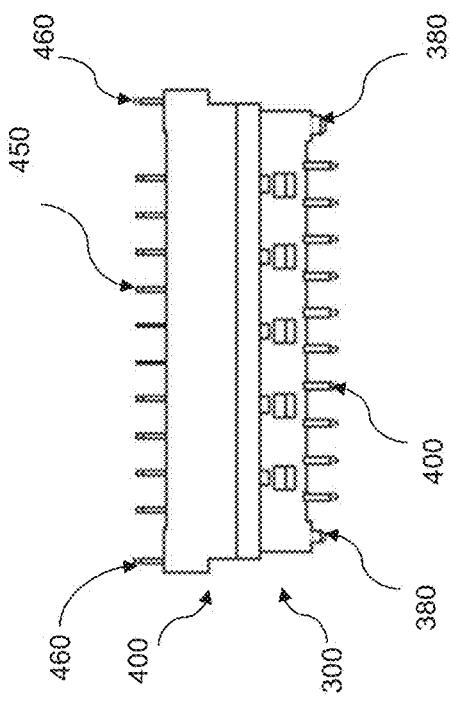
FIG. 33 is a side view of an electrical connector along a first direction in accordance with another embodiment of the invention.

FIG. 33 is a side view of an electrical connector along a first direction in accordance with another embodiment of the invention. The first direction can be a longitudinal direction of the connector with respect to a width direction. The socket pins 450 and the tip portion 350 of the plug pins can be respectively exposed on the first side and second side of the connector, and can be electrically coupled to an electrical component, a circuit board or a cable. In some embodiments, the first side and second side of the connector can be opposite to each such. For instance, the first side can be a top side, and the second side can be a bottom side. Alternatively, the first side and second side of the connector can be adjacent. For instance, the first side can be a top side, and the second side can be a lateral side which intersects with the top side.

In some embodiments, two posts 380 are provided on the bottom side of the plug substrate, each of which is positioned at a longitudinal end of the plug substrate. The two posts can be aligned in a row with the tip portion of the plurality of pins of the plug 300. The two posts can be used to position and align the plug when coupling the plug to an electrical component or a circuit board. In some embodiments, two posts 460 are provided on the top side of the socket housing. The two posts can be provided at a longitudinal end of the socket housing. The two posts can be used to position and align the socket when coupling the socket to an electrical component or a circuit board.

Figure 35:
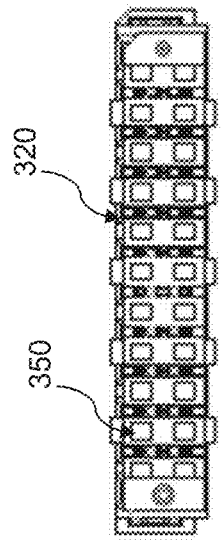
FIG. 35 is a bottom view of an electrical connector in accordance with another embodiment of the invention.
Figure 34:
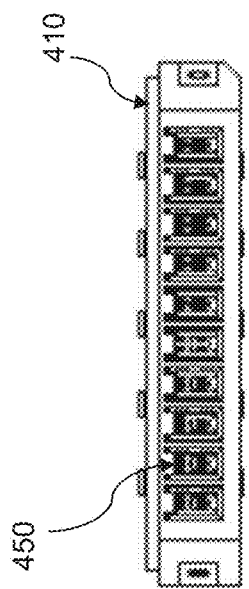
FIG. 34 is a top view of an electrical connector in accordance with another embodiment of the invention.
Figure 36:
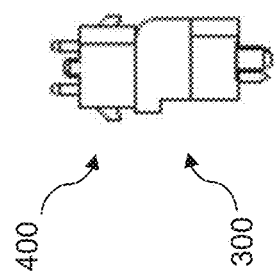
FIG. 36 is a side view of an electrical connector along a second direction in accordance with another embodiment of the invention.

FIG. 34 is a top view of an electrical connector in accordance with another embodiment of the invention. A plurality of socket pins 550 can be provided on the top side of the socket housing 510. The socket pins can be electrical coupled to a circuit board or a cable. FIG. 35 is a bottom view of an electrical connector in accordance with another embodiment of the invention. The tip portion 350 of the plurality of pins of the plug, which are exposed from the bottom side of the plug substrate 320, can be aligned in a row. FIG. 36 is a side view of an electrical connector along a second direction in accordance with another embodiment of the invention. The second direction can be a width direction of the connector with respect to a longitudinal direction. The electrical plug 300 can be assembled with the electrical socket 400 from at least two directions. For instance, the plurality of pins of the plug can be inserted into the corresponding passageways of the socket from both a bottom side and an adjacent lateral side of the socket since the passageways extend from the bottom side to adjacent lateral side of the socket housing.

Figure 37:
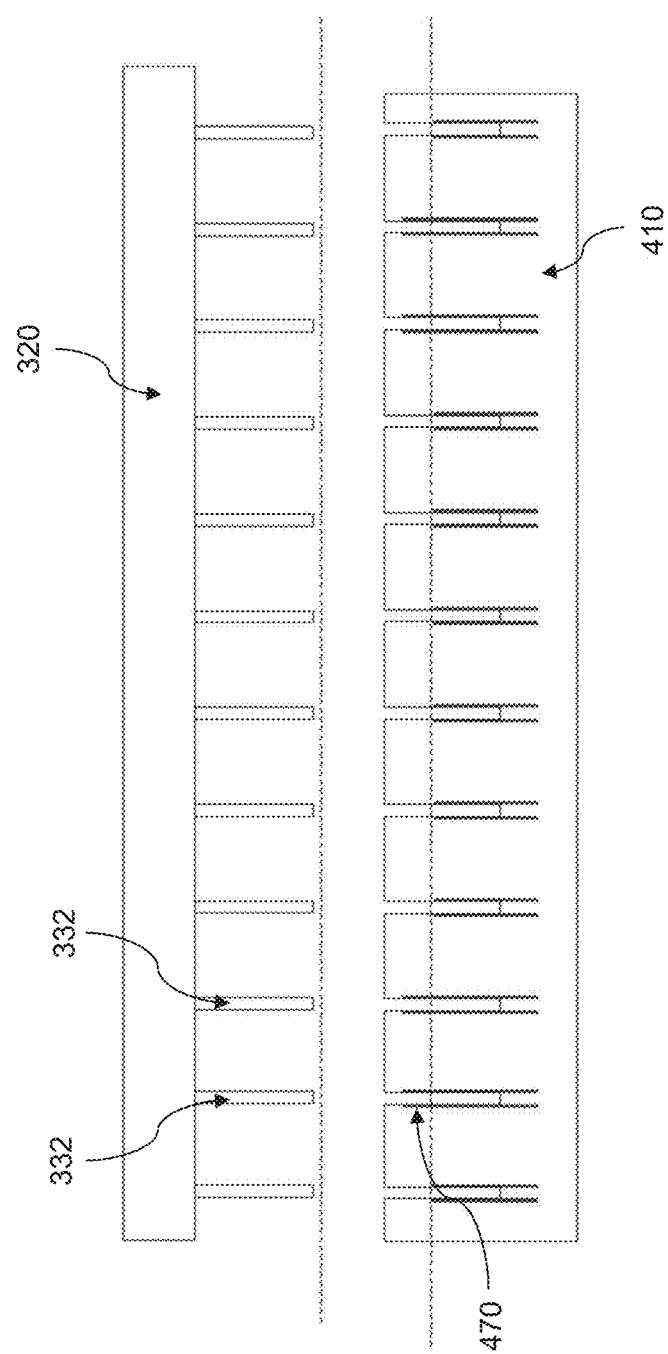
FIG. 37 is a side view of an electrical socket and an electrical plug along a first direction in accordance with another embodiment of the invention.

FIG. 37 is a side view of an electrical socket and an electrical plug along a first direction in accordance with another embodiment of the invention. The first direction can be a longitudinal direction of the socket and the plug with respect to a width direction. The plurality of power pins and at least one signal pin of the electrical plug can extend from the plug substrate 320 with the same length. The contacts received in the plurality of passageways of the socket housing 410 can be provided with different length. In some embodiments, the power contacts 470 having a negative polarity are provided with a longer length than the power contacts having a positive polarity and the signal contact. When the pins of the plug is inserted into the passageways of the socket, corresponding negative pins 332 of the plug can be electrically connected to the longer power contacts 470 having a negative polarity of the socket, which are electrically grounded, before the positive power pins and the at least one signal pin are electrically connected to corresponding contact received in the passageways. This socket contact configuration can prevent an electric spark because the plug is electrically grounded before the positive power pins and the at least one signal pin are electrically connected to corresponding power contacts and signal contact of the socket.

Figure 38:
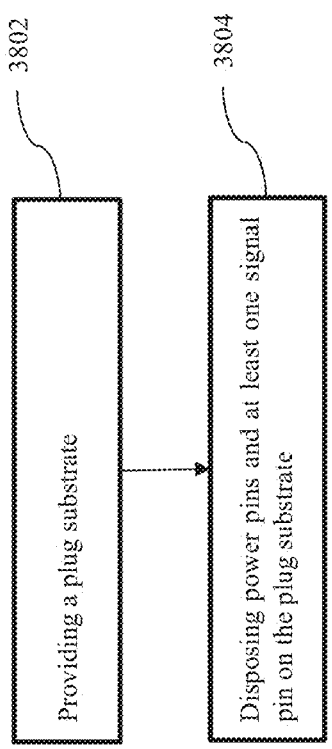
FIG. 38 is a flow chart illustrating a method of manufacturing an electrical plug, in accordance with an embodiment of the invention.

FIG. 38 is a flow chart illustrating a method of manufacturing an electrical plug, in accordance with an embodiment of the invention. In process 3802, a plug substrate can be provided. The plug substrate can be made from an electrically insulating and flame resistant material. The plug substrate can include a base. In some instances, the plug substrate further includes a plurality of side walls which stand from a top side of the base to define an internal space of the plug. The plug substrate can be provided with a plurality of holes in predetermined positions and predetermined pattern, such that a plurality of pin can be inserted into the holes.

In process 3804, a plurality of pins, including a plurality of power pins configured to transmit electrical power and at least one signal pin configured to communicate signal, can be disposed on the plug substrate. The plurality of pins can be inserted into holes on the plug substrate. The plurality of power pins can comprise at least one power pin having a positive polarity and at least one power pin having a negative polarity. In some embodiments, two or more pins having a positive polarity and two or more pins having a negative polarity can be provided on the plug substrate. In some embodiments, two or more signal pins can be provided on the plug substrate.

Figure 39:
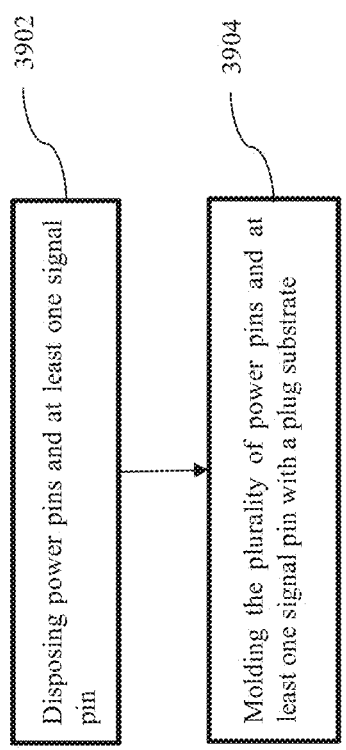
FIG. 39 is a flow chart illustrating a method of manufacturing an electrical plug, in accordance with another embodiment of the invention.

FIG. 39 is a flow chart illustrating a method of manufacturing an electrical plug, in accordance with another embodiment of the invention. In process 3902, a plurality of pins, including a plurality of power pins configured to transmit electrical power and at least one signal pin configured to communicate signal, can be provided. The plurality of power pins can comprise at least one power pin having a positive polarity and at least one power pin having a negative polarity. In some embodiments, two or more pins having a positive polarity and two or more pins having a negative polarity can be provided. In some embodiments, two or more signal pins can be provided. The plurality of power pins can be provided and positioned in predetermined positions and predetermined pattern.

In process 3904, the plurality of power pins and at least one signal pin can be molded with a plug substrate. The plug substrate can be made from an electrically insulating and flame resistant material. The plurality of can be molded such that a first end of the plurality of the pins can be exposed from a first side of the plug substrate, and a second end of the pins can be exposed from a second side of the plug substrate. The electrical plug can be manufactured by various processes, not limited to the processes as discussed hereinabove.

Figure 40:
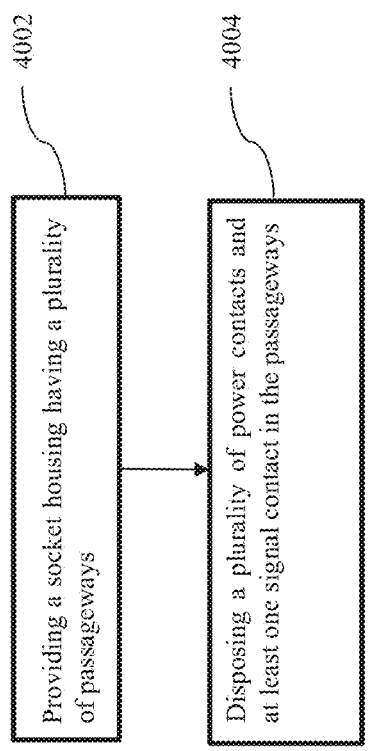
FIG. 40 is a flow chart illustrating a method of manufacturing an electrical socket, in accordance with an embodiment of the invention.

FIG. 40 is a flow chart illustrating a method of manufacturing an electrical socket, in accordance with an embodiment of the invention. In process 4002, a socket housing can be provided. The socket housing can be made from an electrically insulating and flame resistant material. A plurality of passageways can be formed in the socket housing. The plurality of passageways can engage with corresponding plug pins of a mating electrical plug. Each of the plurality of passageways can extend from a first side to a second side of the socket housing. In some instances, the first side can be opposite to the second side. For instance, the plurality of passageways can extend from the top side to bottom side of the socket housing. Alternatively, the first side can be adjacent to the second side. For instance, the plurality of passageways can extend from the top side to an adjacent lateral side of the socket housing.

In process 4004, a plurality of contacts can be disposed in the passageways. Each of the plurality of contacts can be configured to electrically contact a corresponding plug pin of a mating electrical plug in the passageways. The plurality of contacts can be made from a metal material having good conductivity. The plurality of contacts can include at least one signal contact configured to communicate signal and a plurality of power contacts configured to transmit electrical power. The plurality of power contacts can include at least one power contact having a first polarity and at least one power contact having a second polarity opposite to the first polarity. In some instances, the first polarity is a positive polarity, and the second polarity is a negative polarity.

In some embodiments, a plurality of socket pins can be provided on a top side of the socket. A first portion of the socket pins can be exposed from the top side of the socket and configured to electrically connect to an electrical component, a circuit board or a cable. A second portion of the socket pins can be received in the plurality of passageways and configured to electrically connect with corresponding pins of a mating electrical plug when the mating electrical plug is inserted into the socket. In some instances, the contacts can be the second portion of the socket pins received in the plurality of passageways. Alternatively, the contacts can be a portion of the second portion of the socket pins. Alternatively, the contacts can be electrically connected to the second portion of the socket pins. The electrical socket can be manufactured by various processes, not limited to the processes as discussed hereinabove.

Figure 41:
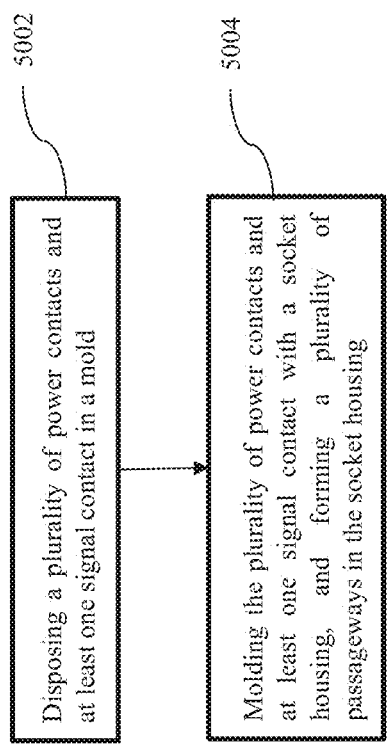
FIG. 41 is a flow chart illustrating a method of manufacturing an electrical socket, in accordance with another embodiment of the invention.

FIG. 41 is a flow chart illustrating a method of manufacturing an electrical socket, in accordance with an embodiment of the invention. In process 5002, a plurality of contacts are disposed in a mold. The plurality of contacts can be configured to electrically contact a corresponding plug pin of a mating electrical plug. The plurality of contacts can be made from a metal material having good conductivity. The plurality of contacts can include at least one signal contact configured to communicate signal and a plurality of power contacts configured to transmit electrical power. The plurality of power contacts can include at least one power contact having a first polarity and at least one power contact having a second polarity opposite to the first polarity. In some instances, the first polarity is a positive polarity, and the second polarity is a negative polarity.

In process 5004, the plurality of contacts is molded with a socket housing, and a plurality of passageways can be formed in the socket housing. Each of the plurality of passageways extends from a first side to a second side of the socket housing and receives therein at least one contact of the plurality of contacts. In some instances, the first side can be opposite to the second side. For instance, the plurality of passageways can extend from the top side to bottom side of the socket housing. Alternatively, the first side can be adjacent to the second side. For instance, the plurality of passageways can extend from the top side to an adjacent lateral side of the socket housing. The socket housing can be made from an electrically insulating and flame resistant material. The plurality of passageways can engage with corresponding plug pins of a mating electrical plug.

Figure 42A:
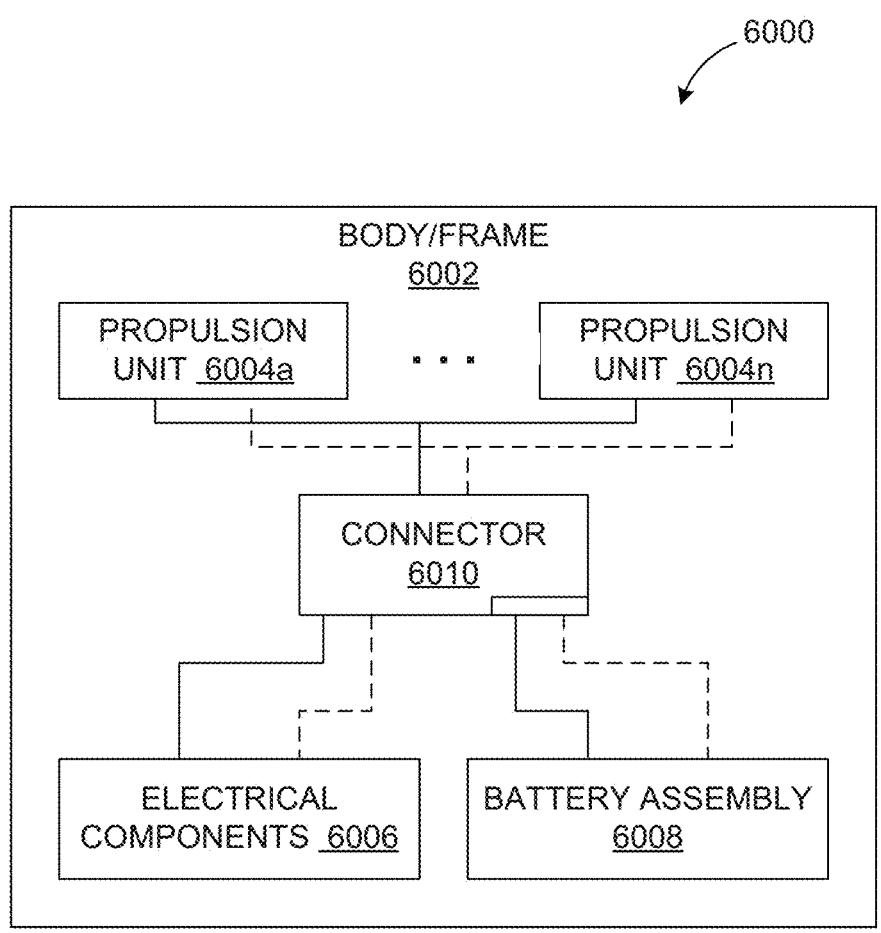
FIG. 42A is a block diagram of a movable object including an electrical plug and FIG. 42B is a view showing a pin arrangement of the electrical plug in accordance with an embodiment of the invention.
Figure 42B:
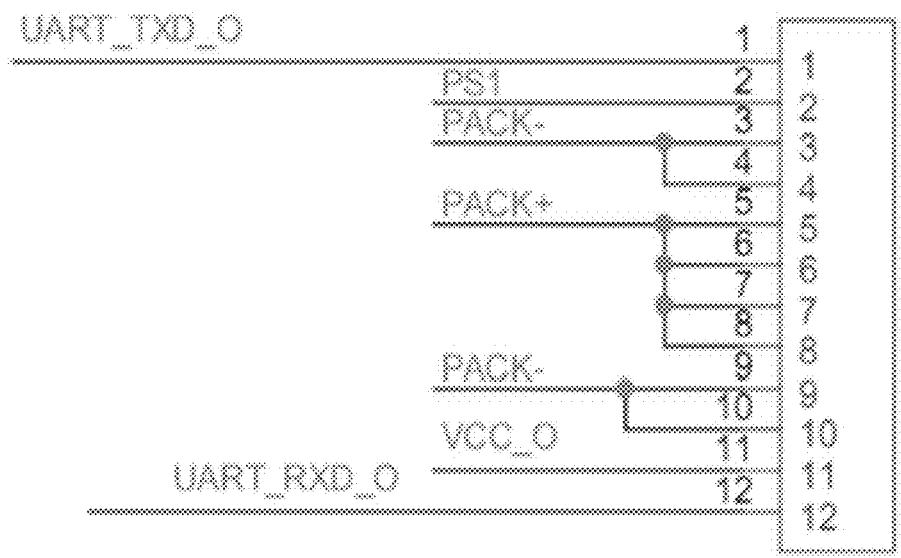

FIG. 42A is a block diagram of a movable object (e.g., unmanned aerial vehicle (UAV) 6000) including an electrical plug in accordance with an embodiment of the invention. The UAV 6000 includes a body 6002 (e.g., a frame) connected to a set of propulsion units 6004 (e.g., a set of one or more of propulsion units 6004a-6004n), electrical components 6006, and a battery assembly 6008. A connector 6010 electrically couples the battery assembly 6008 to the electrical components 6006 and the propulsion units 6004. The connector 6010 transfers power (i.e. illustrated using solid lines) and signals (i.e. illustrated using dashed lines) between the battery assembly 608, the electrical components 6006, and the propulsion units 6004. For the connector 6010, FIG. 42B is a view showing pin arrangement of the electrical plug in accordance with an embodiment of the invention. The electrical plug can comprise a plurality of pins. For instance, the electrical plug as shown in FIG. 42 comprises 12 pins. The plurality of pins can comprise at least one signal pin configured to transmit signal and a plurality of power pins and configured to transmit electrical power. For instance, the plurality of pins as shown in FIG. 42 comprise signal pins 1, 2 and 12, and power pins 3-11. The signal pins 1 and 12 transmit and receive signals to and from a bus, such as a Universal Asynchronous Receiver/Transmitter (UART). The signal pin 2 transmits and receives a signal indicative of a battery status, such as whether a battery is connected. The power pins 3, 4 and power pins 9, 10 are power pins having a negative polarity. The power pins 5, 6, 7 and 8 are power pins having a positive polarity. The power pins 5, 6, 7 and 8 having a positive polarity and signal pins 1 and 2 are positioned on opposite sides of the power pins 3 and 4 having a negative polarity. The power pin 11 is a power pin for outputting power to an external device. Another set of pins can be provided which are disposed symmetrically opposite to the pins 1-12, such that the plug can be connected to a corresponding socket in both a forward direction and a reverse direction.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An unmanned aerial vehicle, comprising:
    a body;
    a plurality of propulsion units carried by the body and configured to effect movement of the unmanned aerial vehicle;
    an electrical plug for power and signal transmission and provided on the body, the electrical plug, comprising:
        a plurality of pins comprising at least one signal pin configured to communicate a signal, and a plurality of power pins configured to transmit electrical power, the plurality of power pins comprising at least one power pin having a positive polarity and at least one power pin having a negative polarity; and
        a plug substrate supporting the plurality of pins; and
    a battery assembly electrically connected to the body via the electrical plug, the battery assembly comprising:
        at least one battery; and
        an electrical socket comprising a socket housing having a plurality of passageways, wherein
            the plurality of passageways are arranged corresponding to an arrangement of the at least one signal pin and the plurality of power pins of the electrical plug,
            each of the plurality of passageways includes therein a contact positioned to electrically contact a corresponding signal pin or power pin of the electrical plug, the electrical contacts comprising at least one signal contact configured to communicate the signal, and a plurality of power contacts configured to transmit electrical power, the plurality of power contacts comprising at least one power contact having a positive polarity and at least one power contact having a negative polarity;
    wherein all of: the at least one power pin having a negative polarity, the at least one power pin having a positive polarity, and the at least one signal pin, protrude from a top side of the plug substrate, and are aligned in a single row,
    wherein the at least one power pin having a positive polarity and the at least one signal pin are disposed on opposite sides of the at least one power pin having a negative polarity, and
    wherein the at least one power pin having a negative polarity has a longer length than the at least one power pin having a positive polarity and the at least one signal pin.

2. The unmanned aerial vehicle of claim 1, wherein the at least one power pin having a positive polarity comprising a power pin which is configured to output a constant voltage.

3. The unmanned aerial vehicle of claim 1, wherein the at least one signal pin comprises at least one signal pin for transmitting signal and at least one signal pin for receiving signal.

4. The unmanned aerial vehicle of claim 1, wherein the at least one signal pin comprising only one signal pin for transmitting and receiving signal.

5. The unmanned aerial vehicle of claim 1, wherein the at least one signal pin comprising a signal pin which is configured to detect a connecting status of the electrical plug to the electrical socket.

6. The unmanned aerial vehicle of claim 1, wherein the plug substrate includes a base.

7. The unmanned aerial vehicle of claim 6, wherein the plug substrate further includes a plurality of side walls defining the internal space and surrounding the power pins and the at least one signal pin.

8. The unmanned aerial vehicle of claim 7, wherein a height of the plurality of power pins and at least one signal pin is less than a height of the side walls.

9. The unmanned aerial vehicle of claim 7, wherein the internal space of the plug is configured to receive therein at least a portion of a mating electrical socket.

10. The unmanned aerial vehicle of claim 1, wherein a first end of the power pins and the at least one signal pin is exposed at a first side of the plug substrate, and a second end of the power pins and the at least one signal pin is exposed at a second side of the plug substrate.

11. The unmanned aerial vehicle of claim 10, wherein the first side being opposite to the second side.

12. The unmanned aerial vehicle of claim 1, wherein a first end of the power pins and the signal pin is a contacting portion, the contacting portion being configured to electrically connect with a mating electrical socket.

13. The unmanned aerial vehicle of claim 12, wherein the first end of the power pins and the at least one signal pin is received in an internal space of the plug substrate, the internal space being defined by a plurality of side walls of the plug substrate.

14. The unmanned aerial vehicle of claim 1, wherein a second end of the power pins and the at least one signal pin is a tip portion, the tip portion being configured to electrically connect to a circuit board or a cable.

15. The unmanned aerial vehicle of claim 14, wherein the tip portion is a soldering portion.

16. The unmanned aerial vehicle of claim 14, wherein the tip portion has at least two protrusions which are parallel to each other.

17. The unmanned aerial vehicle of claim 14, wherein the circuit board is a printed circuit board.

18. The unmanned aerial vehicle of claim 14, wherein the tip portion has a reduced width than other parts of the power pins and the at least one signal pin.

19. The unmanned aerial vehicle of claim 18, wherein the tip portion staggers in a row.

20. The unmanned aerial vehicle of claim 1, wherein the at least one power pin having a positive polarity and the at least one signal pin have the same length.

21. The unmanned aerial vehicle of claim 1, wherein the at least one power pin having a negative polarity has a same length as the at least one power pin having a positive polarity and the at least one signal pin.

22. The unmanned aerial vehicle of claim 1, wherein the plurality of power pins and the at least one signal pin comprise a first set of power pins and signal pins and a second set of power pins and signal pins, and wherein the first and second sets of power pins and signal pins are disposed symmetrically opposite to each other on the plug substrate.

23. The unmanned aerial vehicle of claim 22, wherein the second set of power pin and the at least one signal pin are provided in a row with the first set of power pins and the at least one signal pin.

24. The unmanned aerial vehicle of claim 1, wherein the electrical plug further comprising a positioning groove.

25. The unmanned aerial vehicle of claim 24, wherein the power pins and the at least one signal pin are provided within the positioning groove.

26. The unmanned aerial vehicle of claim 24, wherein the positioning groove of the plug is configured to clearance fit with a positioning boss of a mating electrical socket.

27. The unmanned aerial vehicle of claim 1, wherein the electrical plug further comprising at least one post protruding from the plug substrate on the same side of the plug substrate on which the power pins and the at least one signal pin are supported, the at least one post being configured to engage with a corresponding positioning hole of a mating electrical socket.

28. The unmanned aerial vehicle of claim 27, wherein the at least one post aligns with the power pins and the at least one signal pin.

29. An unmanned aerial vehicle, comprising:
a body;
a plurality of propulsion units carried by the body and configured to effect a moving of the unmanned aerial vehicle;
a battery assembly; and
an electrical connector for power and signal transmission, the electrical connector comprising:
an electrical plug, comprising:
at least one signal pin configured to communicate a signal;
a plurality of power pins configured to transmit electrical power, wherein the plurality of power pins comprises at least one power pin having a positive polarity and at least one power pin having a negative polarity; and
a plug substrate supporting the at least one signal pin and the plurality of power pins, wherein the at least one power pin having a negative polarity has a longer length than the at least one power pin having a positive polarity and the at least one signal pin; and
an electrical socket comprising a socket housing having a plurality of passageways, wherein the plurality of passageways are arranged corresponding to an arrangement of the at least one signal pin and the plurality of power pins of the electrical plug, each of the plurality of passageways having therein a contact positioned to electrically contact a corresponding signal pin or power pin of the electrical plug, the contacts comprising at least one signal contact configured to communicate the signal, and a plurality of power contacts configured to transmit electrical power, the plurality of power contacts comprising at least one power contact having a positive polarity and at least one power contact having a negative polarity;
wherein all of: the at least one power pin having a negative polarity, the at least one power pin having a positive polarity, and the at least one signal pin, protrude from a top side of the plug substrate, and are aligned in a single row,
wherein the at least one power pin having a positive polarity and the at least one signal pin are disposed on opposite sides of the at least one power pin having a negative polarity,
wherein the at least one power pin having a negative polarity has a longer length than the at least one power pin having a positive polarity and the at least one signal pin, and
wherein the battery assembly is adapted to provide power to said one or more propulsion units via the electrical connector.

\* \* \* \* \*